(12) United States Patent
Takano et al.

(10) Patent No.: US 6,662,579 B2
(45) Date of Patent: Dec. 16, 2003

(54) VEHICLE AIR CONDITIONER HAVING REFRIGERANT CYCLE WITH HEATING FUNCTION

(75) Inventors: Yoshiaki Takano, Kosai (JP); Takahisa Suzuki, Kariya (JP); Satoshi Izawa, Anjo (JP); Keisuke Nagai, Toyota (JP); Shun Kurata, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/242,528

(22) Filed: Sep. 12, 2002

(65) Prior Publication Data

US 2003/0046943 A1 Mar. 13, 2003

(30) Foreign Application Priority Data

Sep. 13, 2001 (JP) ........................................ 2001-278330
Jun. 12, 2002 (JP) ........................................ 2002-171595

(51) Int. Cl.$^7$ .......................... F25D 21/00; F25D 17/04
(52) U.S. Cl. .......................... 62/186; 62/272; 62/176.2; 236/44 R
(58) Field of Search .......................... 62/186, 272, 159, 62/160, 176.1, 176.2, 176.6, 196.4; 236/44 R, 44 A, 44 C

(56) References Cited

U.S. PATENT DOCUMENTS 6,311,505 B1   11/2001   Takano et al.

FOREIGN PATENT DOCUMENTS

| JP | 1-239353 | 9/1989 |
|---|---|---|
| JP | 5-254338 | 10/1993 |
| JP | 5-272817 | 10/1993 |
| JP | 6-305398 | 11/1994 |

*Primary Examiner*—Chen Wen Jiang
(74) *Attorney, Agent, or Firm*—Harness, Dickey & Pierce, PLC

(57) ABSTRACT

In a vehicle air conditioner, a refrigerant cycle system is constructed to switch a cooling refrigerant cycle where an interior heat exchanger is used as an evaporator, and a hot gas heater cycle where the interior heat exchanger is used as a radiator. Further, it is determined whether the interior heat exchanger has a quantity of retained water in a heating mode due to the hot gas heater cycle. When it is determined that the quantity of retained water is in the interior heat exchanger in the heating mode, operation of a compressor of the refrigerant cycle system is intermittently controlled so that temperature of air blown from the interior heat exchanger becomes lower than temperature of a vehicle windshield.

20 Claims, 14 Drawing Sheets

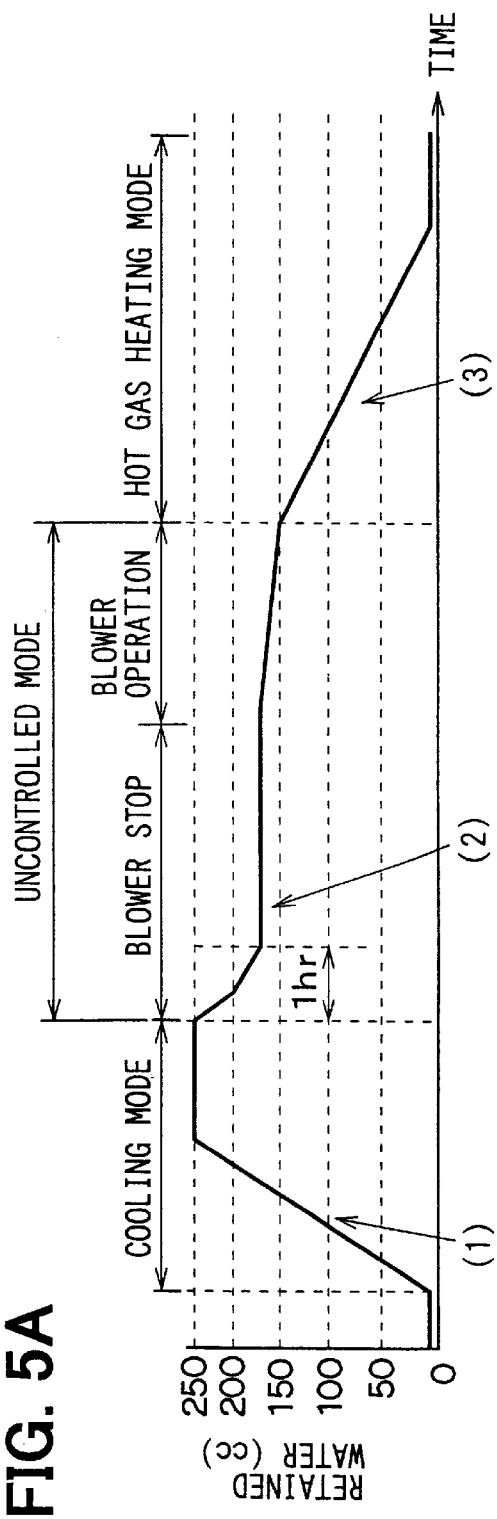
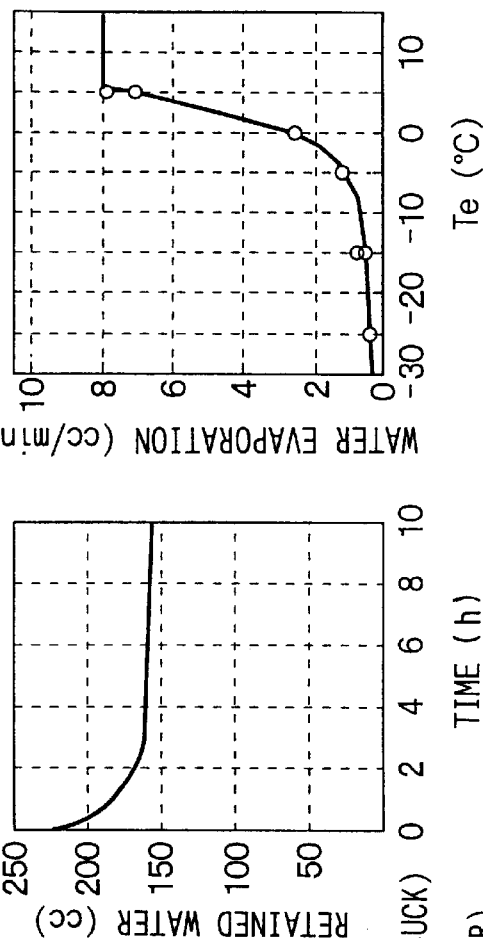
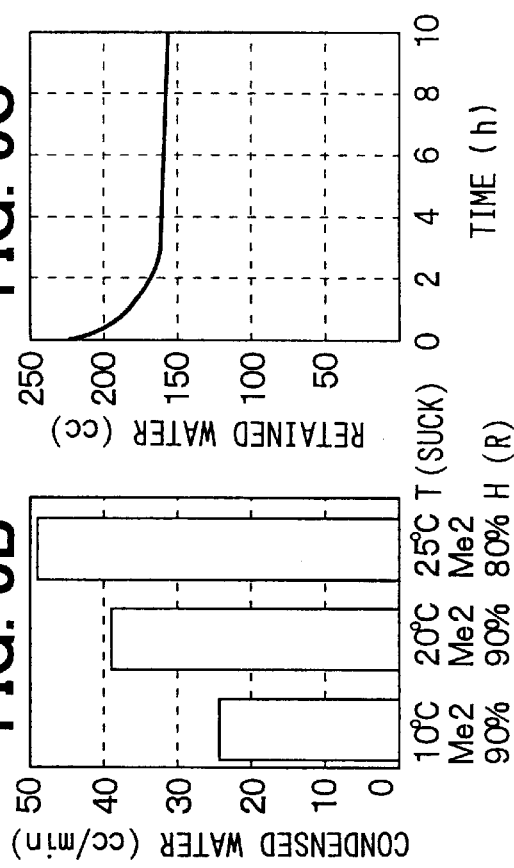

| | |
|---|---|
| (1) | $\{Te - Tam \geq 5°C \ \& \ Tam \geq 15°C\} \rightarrow W(E) = 5.00 \ (cc/min)$ |
| (2) | $\{Te - Tam \geq 5°C \ \& \ Tam \geq 10°C\} \rightarrow W(E) = 3.33 \ (cc/min)$ |
| (3) | $\{Te - Tam \geq 5°C \ \& \ Tam \geq 0°C\} \rightarrow W(E) = 1.67 \ (cc/min)$ |
| (4) | $\{Te - Tam \geq 3°C \ \& \ Tam \geq 15°C\} \rightarrow W(E) = 2.50 \ (cc/min)$ |
| (5) | $\{Te - Tam \geq 3°C \ \& \ Tam \geq 10°C\} \rightarrow W(E) = 1.67 \ (cc/min)$ |
| (6) | $\{Te - Tam \geq 3°C \ \& \ Tam \geq 0°C\} \rightarrow W(E) = 0.83 \ (cc/min)$ |

# VEHICLE AIR CONDITIONER HAVING REFRIGERANT CYCLE WITH HEATING FUNCTION

CROSS REFERENCE TO RELATED APPLICATION

This application is based on Japanese Patent Applications No. 2001-278330 filed on Sep. 13, 2001 and No. 2002-171595 filed on Jun. 12, 2002, the disclosure of which is incorporated herein by reference.

FIELD OF THE INVENTION

The present invention relates to a vehicle air conditioner having a hot gas heating function using an interior heat exchanger (evaporator) as a radiator by directly introducing a gas refrigerant (hot gas) discharged from a compressor into the interior heat exchanger. The present invention relates particularly to a system in which condensed water is prevented from evaporating in the interior heat exchanger and from fogging a vehicle windshield in a heating mode.

BACKGROUND OF THE INVENTION

In a conventional vehicle air conditioner, hot water (i.e., engine cooling water) is circulated in a heating heat exchanger during a heating operation in winter to heat air to be conditioned in the heating heat exchanger by using the hot water as a heat source. In this case, when the hot water temperature is low, the temperature of air to be blown into a passenger compartment is lowered and thus may be insufficient for a heating capacity.

Thus, JP-A No. H5-272817 proposes a vehicle air conditioner which has a heating function by using a hot gas heater cycle. When the hot water temperature is lower than a predetermined value as just after the start-up of an engine, gas refrigerant (or hot gas) discharged from a compressor is introduced into an interior heat exchanger (evaporator) while bypassing a condenser to release the heat from the gas refrigerant to the air to be conditioned in the interior heat exchanger to obtain an auxiliary heating function. That is, in the above conventional vehicle air conditioner, one heat exchanger disposed in an air conditioner case is selectively used as a cooler in a cooling mode and as a radiator in a heating mode.

By the way, in the vehicle air conditioner, an inside air mode may be set to prevent contaminated outside air from being introduced during the heating mode in winter. In this case, it is necessary for the evaporator to cool and dehumidify the air to be conditioned to prevent the windshield from fogging. Accordingly, until an outside air temperature drops to 0° C., the refrigerating cycle may be used in the cooling mode.

After the refrigerating cycle is operated at an outside air temperature of about 0° C. with the cooling mode to prevent the fogging of the windshield, the refrigerating cycle may be switched to the hot gas heater cycle (heating mode) to increase the heating capacity. Moreover, after the refrigerating cycle is operated with the cooling mode and then is stopped at once and is started with the hot gas heating cycle (heating mode).

In the above case, condensed water generated in the cooling mode of the refrigerating cycle remains on the surface of the interior heat exchanger. Thus, if the refrigerating cycle is started in the heating mode, the interior heat exchanger functions as the radiator of the gas refrigerant to rapidly increase the temperature of the interior heat exchanger. Accordingly, the condensed water on the surface of the interior heat exchanger evaporates, and air having a high humidify is blown into the passenger, so that the vehicle windshield is fogged.

Moreover, the condensed water once generated on the interior heat exchanger by the operation of the cooling mode does not easily evaporate at a low outside air temperature in winter and may remain for a long time. Thus, even not just after switching from the cooling mode to the heating mode, the vehicle windshield may be fogged by starting the heating mode of the refrigerating cycle.

Thus, the present inventors proposed, in JP-A No. 2000-219034, an invention of aiming to prevent the condensed water in the interior heat exchanger from evaporating and fogging the vehicle windshield in the heating mode in the vehicle air conditioner having the hot gas heating function.

In this related art, a physical quantity relating to the temperature of the windshield and the inside air humidity in the vicinity of the vehicle windshield are detected and it is determined based on this physical quantity whether or not the windshield is in the state of fogging. When it is determined that the vehicle windshield is in the state of fogging, the refrigerating cycle is controlled so as to suppress the temperature of the interior heat exchanger. More specifically, the temperature of the air blown out of the interior heat exchanger is controlled to suppress the evaporation of the condensed water in the interior heat exchanger to thereby prevent the vehicle windshield from fogging.

However, according to the specific experiment and study of the related art, since whether or not the vehicle windshield is in the state of fogging is indirectly determined (estimated) based on the physical quantities relating to the temperature of the windshield or the inside air humidity in the vicinity of the vehicle windshield, a temperature control not relating to the actual quantity of condensed water that is retained in the interior heat exchanger (in the specification, referred to as "the quantity of retained water") may be performed.

That is, since the quantity of retained water on the interior heat exchanger is not directly determined in the related art as described above, even in the case where the condensed water is not retained on the interior heat exchanger, that is, even in the case where the control of preventing the fogging of the windshield is not actually required because there is no retained water, the temperature of the air blown out of the interior heat exchanger may be suppressed to uselessly limit the heating capacity of the hot gas heating mode.

SUMMARY OF THE INVENTION

In view of the above-described problems, it is an object of the present invention to prevent a vehicle windshield from fogging in a hot gas heating mode.

It is another object of the present invention to correctly determine whether or not the control of preventing the fogging of the vehicle windshield is necessary, and to effectively perform heating capacity in the hot gas heating mode while it can prevent the vehicle windshield from fogging.

According to the present invention, in an air conditioner, a refrigerant cycle system is constructed to switch a cooling refrigerant cycle where refrigerant discharged from a compressor is returned to the compressor through an exterior heat exchanger, a pressure reducing device and an interior heat exchanger, and a hot gas heater cycle where the refrigerant discharged from the compressor is directly introduced to the interior heat exchanger through a hot gas bypass passage while bypassing the exterior heat exchanger. Further, a control unit for controlling operation of the refrigerant cycle system performs a cooling mode for cooling air in the interior heat exchanger by using the cooling refrigerant cycle, and a heating mode for heating air in the interior heat exchanger by using the hot gas heater cycle. The control unit includes determining means for determining whether a quantity of retained water is in the interior heat exchanger, and control means for controlling temperature of air blown out of the interior heat exchanger to a range lower than a dew point even when air blown out of the air conditioning case is cooled by a vehicle windshield when the determining means determines that the quantity of retained water is in the interior heat exchanger in the heating mode. Accordingly, in the heating mode due to the hot gas heater cycle, it can accurately prevent the vehicle windshield from fogging. In addition, when the determining means determines that the quantity of retained water is in the interior heat exchanger, the control means controls the temperature of air blown out of the interior heat exchanger to a range lower than the dew point. On the other hand, when the determining means determines that the interior heat exchanger does not have the quantity of retained water, the temperature of air blown out of the interior heat exchanger is not restricted. Thus, heating capacity in the heating mode can be effectively improved.

Preferably, the control means controls the temperature of air blown out of the interior heat exchanger to be lower than temperature of the vehicle windshield when the determining means determines that the quantity of retained water is in the interior heat exchanger. Since air is forcibly passed through the interior heat exchanger even if condensed water evaporates in the heating mode, the relative humidity of air blown from the interior heat exchanger is generally about from 80% to 90%. Thus, even if air near the vehicle windshield is cooled by the vehicle windshield to be reduced to the same temperature as the vehicle windshield, the relative humidity of air near the vehicle windshield is increased to only from 80% to 90% that is same degree as the relative humidity of air blown from the interior heat exchanger.

Further, the control unit corrects a target temperature of air blown out of the interior heat exchanger with respect to the temperature of the vehicle windshield, based on a blowing mode of air blown out of the air conditioning case and a quantity of air blown into the air conditioning case. Accordingly, when the quantity of blown air is large and in the blowing mode where the rate of moisture evaporated and blown to the inner surface of the vehicle windshield is small, the target temperature of air blown from the interior heat exchanger is corrected to a higher temperature side, so that the heating capacity in the heating mode can be improved.

Preferably, the control means controls the temperature of air blown out of the interior heat exchanger by controlling a discharge capacity of the compressor. Specifically, the discharge capacity of the compressor can be controlled by an intermittent control of compressor operation, a variable control of the discharge capacity of the compressor, a variable control of the rotation speed of the compressor and the like.

Preferably, the control unit calculates the quantity of evaporation of condensed water in the interior heat exchanger in an air blowing mode, and the quantity of evaporation of condensed water in the air blowing mode is used as information for calculating the quantity of retained water. Therefore, the quantity of retained water can be accurately calculated.

On the other hand, the temperature of the vehicle windshield is calculated based on an outside air temperature and a temperature increase of the vehicle windshield due to air blown out of the air conditioning case. Therefore, the temperature of the vehicle windshield can be accurately calculated without using a temperature sensor only for detecting the temperature of the windshield. Further, the temperature increase is calculated based on information relating to the temperature of air blown out of the air conditioning case, and information relating to the quantity of air blown out toward the vehicle windshield among air blown out of the air conditioning case.

Preferably, the temperature of the vehicle windshield is calculated based on an outside air temperature, information relating to a temperature of air blown out toward the vehicle windshield from the air conditioning case, and information relating to a vehicle speed. Therefore, the temperature of the vehicle windshield can be more accurately calculated.

BRIEF DESCRIPTION OF THE DRAWINGS

Other objects, features and advantages of the present invention will become more apparent from the following detailed description made with reference to the accompanying drawings, in which:

FIG. 5A is a graph for calculating the quantity of retained water in the evaporator in accordance with the first embodiment, FIG. 5B is a graph showing the quantity of condensed water for unit time in a cooling mode shown in FIG. 5A, FIG. 5C is a graph showing the quantity of retained water in the evaporator in an uncontrolled mode shown in FIG. 5A, and FIG. 5D a graph showing the quantity of evaporated water for unit time in a hot gas heating mode shown in FIG. 5A;

DETAILED DESCRIPTION OF THE PREFERRED EMBODIMENTS

Preferred embodiments of the present invention will be described hereinafter with reference to the accompanying drawings.

First Embodiment

Figure 1:
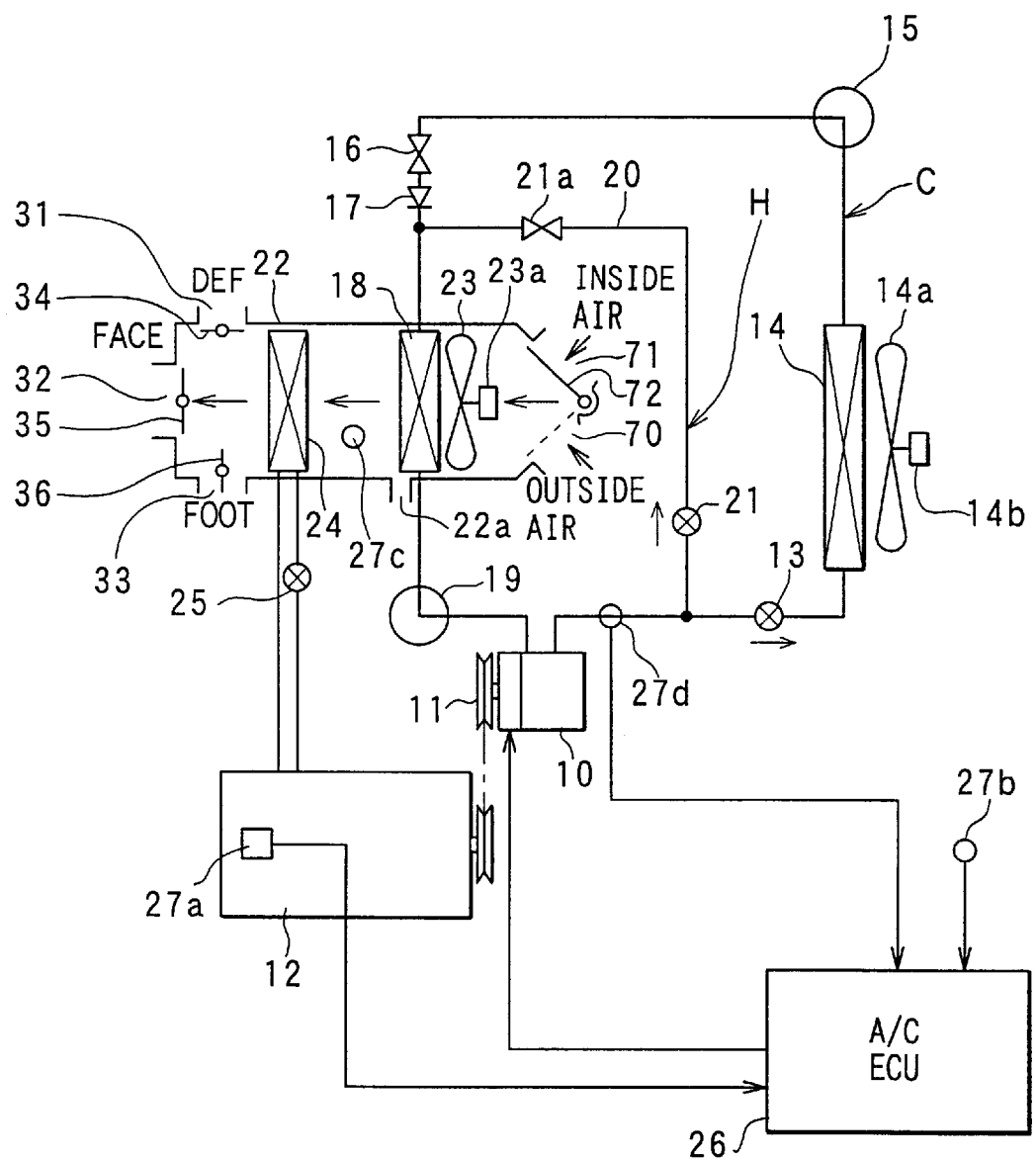
FIG. 1 is a schematic diagram showing the general structure of a vehicle air conditioner according to a first embodiment of the present invention.

FIG. 1 shows the general structure of a vehicle air conditioner in accordance with the first embodiment of the present invention. A compressor 10 is driven through an electromagnetic clutch 11 by a water-cooled vehicle engine 12, and is constructed, for example, by a fixed displacement type swash plate compressor.

The discharge side of the compressor 10 is connected through a solenoid valve 13 for cooling to a condenser 14. The outlet side of the condenser 14 is connected to a liquid receiver 15 for separating the refrigerant into gas refrigerant and liquid refrigerant, and the liquid refrigerant is stored in the receiver 15. The condenser 14 is an exterior heat exchanger which is arranged together with the compressor 10 or the like in a vehicle engine room. The condenser 14 exchanges heat with the outside air (or cooling air) blown by an electric cooling fan 14a. The electric cooling fan 14a is driven by an electrical motor 14b.

Moreover, the outlet side of the liquid receiver 15 is connected to a thermal expansion valve 16 that is a pressure reducing device for cooling. The outlet side of this thermal expansion valve 16 is connected through a check valve 17 to an evaporator 18. The outlet side of the evaporator 18 is connected through an accumulator 19 to the suction side of the compressor 10.

An ordinary cooling refrigerating cycle C is constructed of a closed circuit from the discharge side of the above-mentioned compressor 10 to the suction side of the compressor 10 through the solenoid valve 13 for cooling, the condenser 14, the liquid receiver 15, the thermal expansion valve 16, the check valve 17, the evaporator 18 and the accumulator 19, in this order.

The thermal expansion valve 16, as is well known in the art, regulates its valve opening (or refrigerant flow rate) so that the degree of superheat of the outlet refrigerant of the evaporator 18 can be kept at a predetermined value in an ordinary refrigerating cycle operation (or in a cooling mode). The accumulator 19 separates the refrigerant into the gas refrigerant and the liquid refrigerant, so that the gas refrigerant and a small quantity of liquid refrigerant (in which the oil dissolves) in the vicinity of the bottom are sucked into the compressor 10.

On the other hand, between the discharge side of the compressor 10 and the inlet side of the evaporator 18, a hot gas bypass passage 20 through which refrigerant is directly introduced into the evaporator 18 while bypassing the condenser 14 and the like is provided. A solenoid valve for heating 21 and a throttle 21a are disposed in series in the hot gas bypass passage 20. The throttle 21a is a pressure reducing unit for the heating operation. The throttle 21a can be constructed by a fixed throttle such as an orifice or a capillary tube. A hot gas heater cycle H for the heating operation is constructed of a closed circuit from the discharge side of the compressor 10 to the suction side of the compressor 10 through the solenoid valve for heating 21, the throttle 21a, the evaporator 18 and the accumulator 19, in this order.

An air conditioner case 22 of the vehicle air conditioner defines an air passage through which air flows into a passenger compartment. The air is blown in the air conditioner case 22 by an electric air conditioning blower 23. The air conditioning blower 23 is shown by an axial-flow type to simply show it, but, in reality, is a centrifugal blower having a centrifugal fan. The air conditioning blower 23 is rotated by a blower motor 23a controlled by a blower drive circuit. Here, it is possible to change the quantity of air blown by the blower 23 in the embodiment continuously or stepwise by adjusting a blower control voltage applied to the blower motor 23a.

Further, on the suction side of the air conditioning blower 23a, an outside air suction port 70 for sucking air outside the passenger compartment (hereinafter referred to as "outside air"), and an inside air suction port 71 for sucking air inside the passenger compartment (hereinafter referred to as "inside air") are provided. The inside air suction port 71 and the outside air suction port 70 are opened and closed by an inside air/outside air switching door (inside air/outside air switching means) 72. Here, the inside air/outside air switching means 72 is driven via a link mechanism (not shown) by an actuator such as a servo-motor to switch at least an outside air suction mode for sucking the outside air from the outside air suction port 70 and an inside air suction mode for sucking the inside air from the inside air suction port 71.

The evaporator 18 is an interior heat exchanger which is disposed in the air conditioner case 22. The refrigerant is circulated in the cooling mode by the refrigerating cycle C for the cooling operation to cool the air blown by the air conditioning blower 23 through the refrigerant evaporation (heat absorption) in the evaporator 18. On the other hand, in the heating mode, a hot gas refrigerant (hot gas) flows into the evaporator 18 through the hot gas bypass passage 20 to heat the air, so that the evaporator 18 functions as a radiator.

Here, in the air conditioning case 22, a discharge port 22a for discharging the condensed water generated in the evaporator 18 is provided at the lower portion of the evaporator 18, so that the condensed water is discharged to the outside of the passenger compartment through a discharge pipe (not shown) connected to the discharge port 22a.

In the air conditioning case 22, at the downstream side of the evaporator 18 in the air flow direction, a hot-water type heating heat exchanger 24 for heating the air from the evaporator 18 by using the hot water (engine cooling water) from the vehicle engine 12 as a heat source is disposed. A hot water circuit from the vehicle engine 12 to the heating heat exchanger 24 is provided with a hot water valve 25 for controlling the flow of the hot water.

By the way, the hot water type heating heat exchanger 24 constitutes a main heating unit for heating the passenger compartment. Relative to the main heating unit, the evaporator 18 (interior heat exchanger) functioning as a heat radiator by the hot gas heater cycle H constitutes an auxiliary heating unit.

On the other hand, on the most downstream side of the air conditioning cased 22 in the air flow direction, plural air outlet ports 31–33 are provided. The plural air outlet ports 31–33 includes a defroster (DEF) blowing port 31 for blowing out conditioned air toward the inside surface of the vehicle front windshield, a face (FACE) blowing port 32 for blowing out conditioned air (mainly, cooled air) toward the face portion (upper half of the body) of an occupant, and a foot (FOOT) blowing port 33 for blowing out conditioned air (mainly, warm air) toward the foot portion (lower half of the body) of the occupant. Moreover, a plurality of mode switching doors 34–36 for selectively opening/closing these blowing ports 31–33 are provided. Here, these mode switching doors 34–36 construct an air-outlet mode switching unit, and are driven by an actuator such as a servo-motor via a link mechanism (not shown).

An air conditioning electronic control unit (herein after referred to as "ECU") 26 is constructed of a microcomputer and its peripheral circuits, and performs a predetermined computation in accordance with preset programs to open and close the solenoid valves 13, 21 and to control the actions of the remaining electronic devices (11, 14a, 23, 25 and the like).

Figure 2:
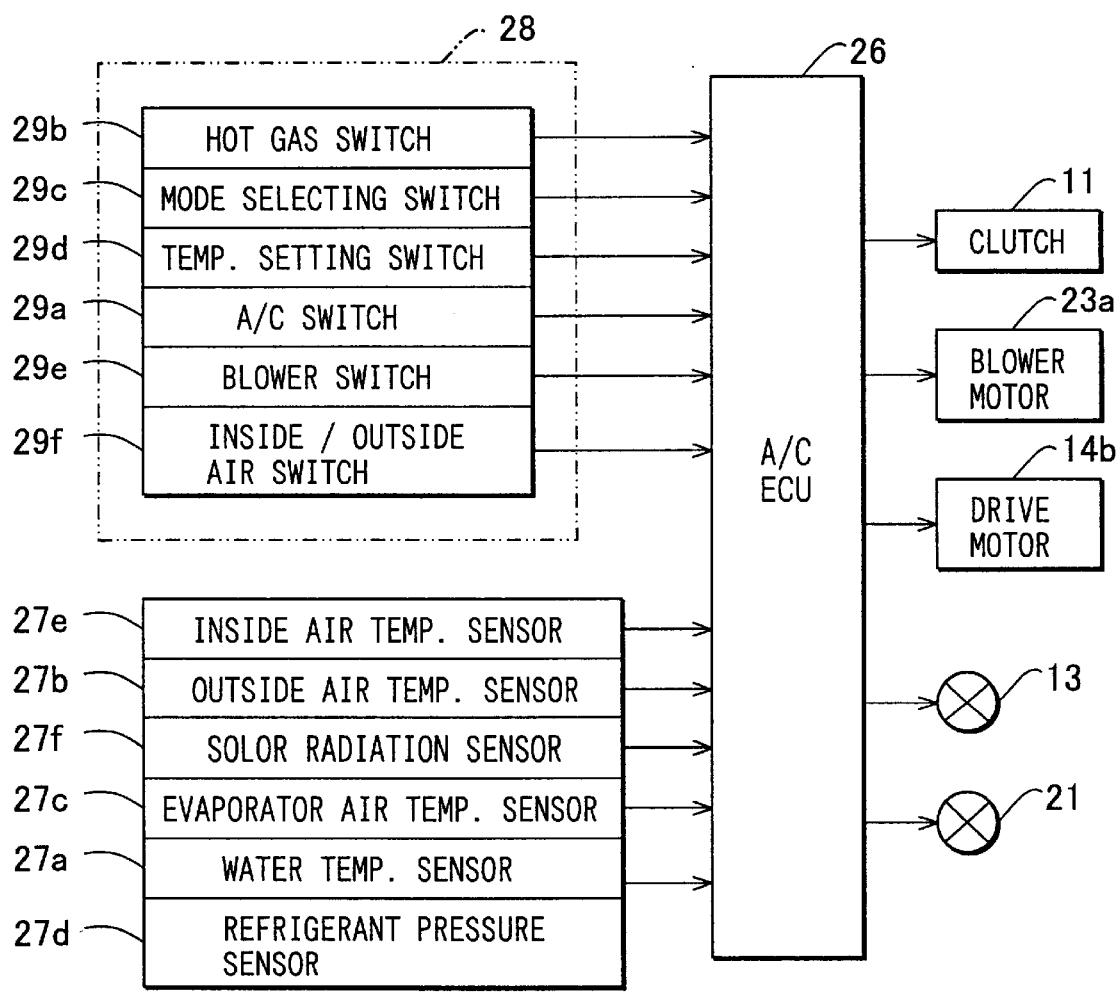
FIG. 2 is a block diagram of an electric control of the first embodiment.

FIG. 2 is an electric control block diagram of the first embodiment. Detection signals are applied to the ECU 26 from a set of sensors including a water temperature sensor 27a of the vehicle engine 12, an outside air temperature sensor 27b, an air temperature sensor 27c of the evaporator 18, and a pressure sensor 27d of a compressor discharge pressure, an inside air temperature sensor 27e, and a solar radiation sensor 27f for detecting the amount of solar radiation into the passenger compartment.

Also, control signals of a group of control switches 29a–29f are applied to the ECU 26 from an air conditioning operation panel 28 that is disposed in the vicinity of a dashboard in the passenger compartment. That is, an air conditioning switch 29a commands the start/stop of the compressor 10 in the refrigerating cycle, and functions as a cooling switch for setting the cooling mode. A hot gas switch 29b sets the heating mode by the hot gas heater cycle H and functions as a heating switch.

Further, the air conditioning operation panel 28 is provided with a blowing mode switching switch 29c for switching the blowing mode of the air conditioner, a temperature setting switch (temperature setting unit) 29d for setting the temperature in the passenger compartment at a desired temperature, a blower switch 29e for commanding turning on/off the blower 23 and switching the amount of air, and an inside air/outside air selection switch 29f for commanding switching between the outside air suction mode and the inside air suction mode.

Next, in the above construction, the operation of the above embodiment will now be described. First, the operation of the refrigerating cycle system will be described. When the air conditioning switch 29a is turned on to set the cooling mode, the solenoid valve 13 for cooling is opened and the solenoid valve for heating 21 is closed by the ECU 26. Thus, when the electromagnetic clutch 11 becomes in the connecting state and the compressor 10 is driven by the engine 12, the gas refrigerant discharged from the compressor 10 flows through the solenoid valve 13 for cooling, which is in the open state, into the condenser 14.

In the condenser 14, the refrigerant is cooled and condensed by the outside air that is blown by the cooling fan 14a. Then, the refrigerant having passed through the condenser 14 is separated by the liquid receiver 15 into the gas refrigerant and the liquid refrigerant. The separated liquid refrigerant is exclusively reduced in pressure by the thermal expansion valve 16 so that a gas-liquid two-phase refrigerant with low temperature and low pressure is obtained.

Next, the low-pressure refrigerant passes through the check valve 17 and flows into the evaporator 18 and evaporates by absorbing heat from the air blown by the blower 23. The air cooled in the evaporator 18 flows into the passenger compartment to cool the passenger compartment. The gas refrigerant evaporated in the evaporator 18 is sucked into the compressor 10 through the accumulator 19 to be compressed in the compressor 10.

When the hot gas switch 29b is turned on in winter to set the heating mode by using the hot gas heater cycle H, the solenoid valve 13 for cooling is closed and the solenoid valve for heating 21 is opened by the ECU 26 so that the hot gas bypass passage 20 is opened. As a result, the high-temperature gas refrigerant (or the superheated gas refrigerant) discharged from the compressor 10 passes through the heating solenoid valve 21 in the open state and is reduced in pressure by the throttle 21a and then flows into the evaporator 18. In other words, the superheated gas refrigerant (hot gas) from the compressor 10 bypasses the condenser 14 and the like and directly flows into the evaporator 18.

At this time, the check valve 17 prevents the gas refrigerant from flowing from the hot gas bypass passage 20 to the thermal expansion valve 16. As a result, in the heating mode, the refrigerating cycle is run by the closed circuit (i.e., the hot gas heater cycle H) of the discharge side of the compressor 10, the solenoid valve 21 for heating, the throttle 21a, the evaporator 18, the accumulator 19, and the suction side of the compressor 10.

Moreover, the superheated gas refrigerant having been reduced in pressure by the throttle 21a heats the blown air by releasing its heat to the blown air in the evaporator 18. Here, the heat quantity to be released from the gas refrigerant in the evaporator 18 corresponds to the compression workload of the compressor 10. The gas refrigerant having released its heat in the evaporator 18 is sucked into the compressor 10 to be compressed after passing through the accumulator 19.

When the hot water temperature is low as just after the start-up of the engine 12, the air conditioning blower 23 is subjected to a warming-up control such that it is started at a small quantity of air. By flowing the hot water through the hot water valve 25 into the hot water type heating heat exchanger 24, the blown air having heated by the evaporator 18 can be further heated in the heating heat exchanger 24. Therefore, even in the cold weather, the warm air, that is heated by both the evaporator 18 and the hot water type heating heat exchanger 24 to have higher temperature, can be blown into the passenger compartment.

Figure 3:
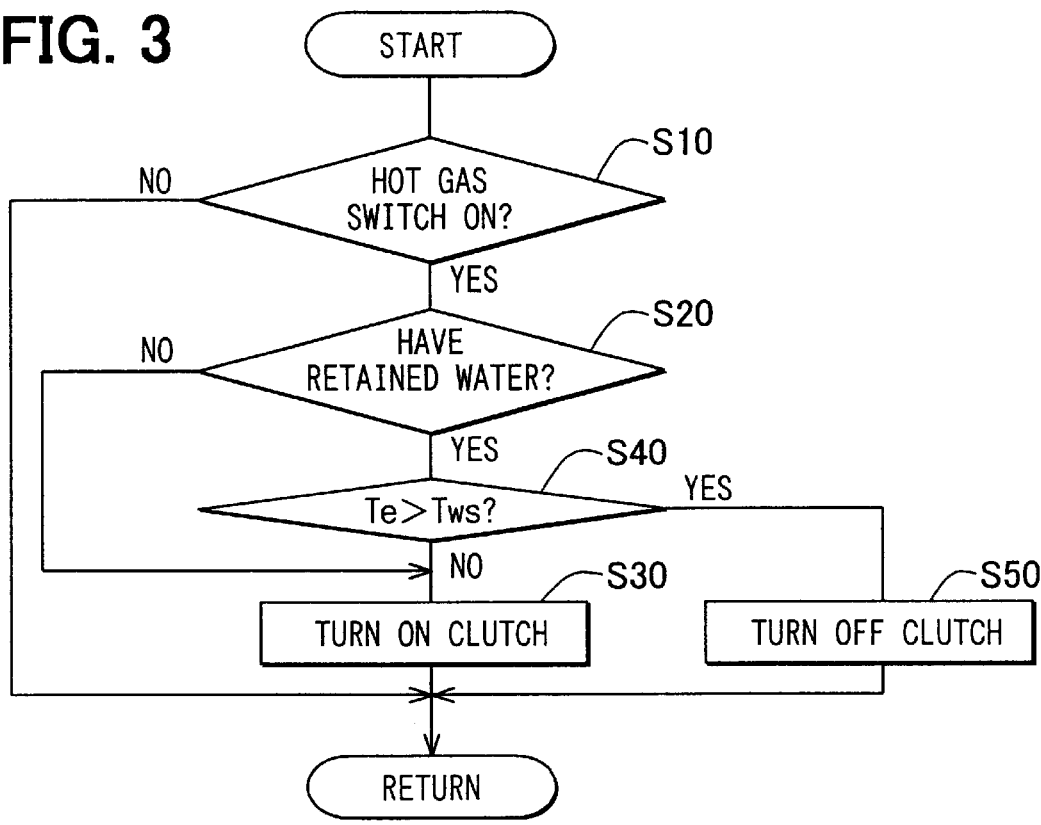
FIG. 3 is a flow chart showing a compressor control in a hot gas heating mode in accordance with the first embodiment.

Next, the capacity control in the heating mode of the hot gas heater cycle H in accordance with the first embodiment will be described specifically with reference to FIG. 3. The control routine of FIG. 3 is started by starting (by turning ON the ignition switch) of the vehicle engine 12. First, at step S10, it is determined whether or not the hot gas switch 29b of the air conditioning operation panel 28 is turned ON. When the hot gas switch 29b is turned ON, that is, when the hot gas heating mode is set, the control routine advances to step S20 where it is determined whether or not the evaporator 18 has a quantity of retained water. A method of calculating the quantity of retained water in the evaporator 18 will be described with reference to FIGS. 5A–5D and FIG. 6. Here, when the hot gas switch 29b is turned ON, the solenoid valve 13 for cooling is closed and the solenoid valve 21 for heating is opened.

If the quantity of retained water in the evaporator 18 becomes smaller than a predetermined minimum quantity close to zero, it is determined at step S20 that no quantity of water is retained in the evaporator 18. When no quantity of water is retained in the evaporator 18, even if the evaporator 18 acts as the heat radiator of the hot gas, the condensed water in the evaporator 18 does not evaporate and hence does not cause the windshield to fog. Then, the control routine advances to step S30 where an electric current is passed through the electromagnetic clutch 11 to put the electromagnetic clutch 11 in the connection state (ON state), whereby the compressor 10 is driven and put into the state of operation (ON) by the vehicle engine 12 via the electromagnetic clutch 11.

On the other hand, at step S20, if the quantity of retained water in the evaporator 18 becomes larger than the predetermined minimum quantity, it is determined that the quantity of water is retained in the evaporator 18 and the control routine advances to step S40 where it is determined whether or not an evaporator air temperature Te from the evaporator 18 is higher than a windshield temperature Tws. Here, the evaporator air temperature Te is the temperature directly detected by the temperature sensor 27c, the windshield temperature Tws is the temperature of the inside surface of the windshield in the passenger compartment. As described below, the temperature of the inside surface of the windshield is calculated (estimated) based on the outside air temperature Tam and a temperature increase caused by the air (warm air) blown into the passenger compartment. Then, if Te>Tws, the control routine advances to step S50 where the electric current passing through the electromagnetic clutch 11 is stopped (OFF) to stop (OFF) the compressor 10. On the other hand, if Te≦Tws, the control routine advances to step S30 where the electromagnetic clutch 11 is put into the connection state (ON) so that the compressor 10 is operated (ON state).

As described above, by intermittently controlling the operation of the compressor 10, the evaporator air temperature Te can be controlled at a temperature lower than the windshield temperature Tws. Here, during the heating operation, to prevent the fogging of the windshield, the outside air suction mode for introducing the outside air of low absolute humidity is selected as the inside air/ outside air suction mode. In the cold weather which requires the heating mode of the hot gas heater cycle H, the low-temperature outside air at a temperature close to 0° C. is introduced into the evaporator 18. Even if the low-temperature outside air is low in absolute humidity, it is originally high in relative humidity. In addition to this, if the condensed water in the evaporator 18 evaporates, the relative humidity of air blown from the evaporator 18 is as high as about from 85% to 90%.

The air blown from the evaporator 18 is heated by the hot-water type heat exchanger 24 to increase its temperature and then is blown into the passenger compartment from the air conditioning case. When this blown air contacts the windshield at a low temperature to be cooled to a temperature lower than the evaporator air temperature Te, it reaches a dew point and condenses and causes the windshield to fog.

However, according to the first embodiment, when the evaporator 18 has the quantity of retained water, the compressor 10 is turned on and off at the steps S40, S30, S50 described above to make the evaporator air temperature Te lower than the windshield temperature Tws. Thus, even if the air blown into the passenger compartment contacts the windshield at the lower temperature to be cooled to a temperature nearly equal to the temperature of the windshield, its relative humidity is increased only to the value (about from 85% to 90%) of the relative humidity of the air blown out of the evaporator 18.

In other words, even if the air blown into the passenger compartment is cooled by the windshield at the steps S40, S30, S50 described above, the evaporator air temperature Te can be controlled within a range not reaching a dew point. This can surely prevent the fogging of the windshield even if the condensed water evaporates in the evaporator 18 in the heating mode.

Figure 4A:
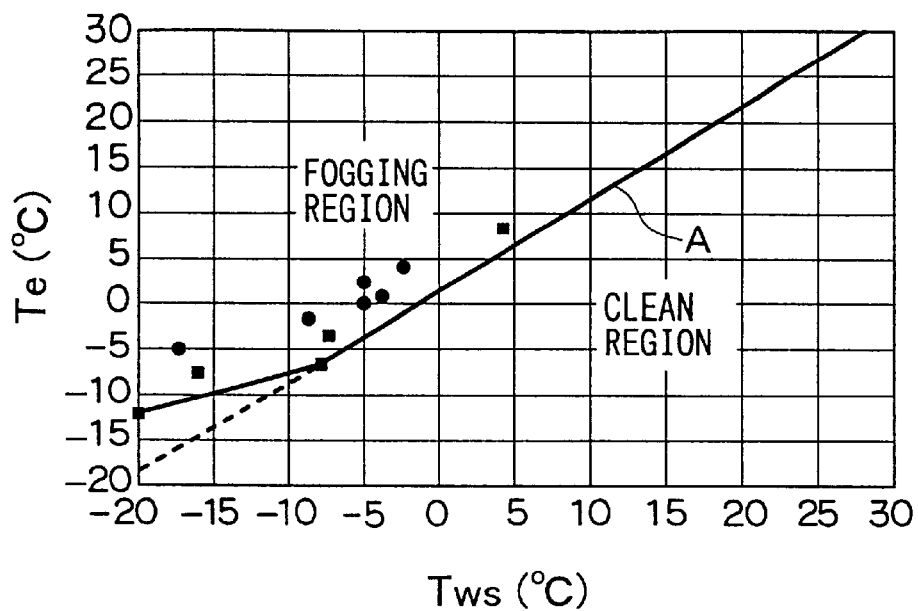
FIG. 4A is a graph obtained by experiment results, showing an evaporator air temperature control in a hot gas heating mode, for preventing a fogging in a vehicle windshield, in accordance with the first embodiment.

FIG. 4A shows the effect of preventing fogging in the hot gas heating mode in accordance with the first embodiment. In FIG. 4A, the vertical axis designates the evaporator air temperature Te, and the horizontal axis designates the windshield temperature Tws. The windshield temperature Tws means the temperature of inside surface of the windshield inside the passenger compartment. In FIG. 4A, the circular mark denotes an actual evaluated value when the windshield (vehicle front windshield) starts to fog in a foot mode. Here, the foot mode means a mode in which the air is blown mainly to the foot area in the passenger compartment from the foot blowing port 33 and in which a small amount of air is blown to the inside surface of the windshield in the passenger compartment from the defroster blowing port 31.

Further, in FIG. 4A, the rectangular mark denotes an actual evaluated value when the windshield (vehicle front windshield) starts to fog in the defroster mode in which the air is blown out to the inside surface of the windshield in the passenger compartment from the defroster blowing port 31. Here, in both the foot mode and the defroster mode, the amount of air is set at a small air amount (Lo) of about 150 $m^3/h$, and the relative humidity of the air blown from the evaporator 18 is 90%.

The line A in FIG. 4A designates a line of the windshield temperature Tws, where the air blown from the evaporator 18 having the relative humidity of 90%, reaches a dew point. That is, the line A in FIG. 4A is a fogging limit line. The upper side of the fogging limitation line A is a fogging region where the windshield fogs, and the lower side of the fogging limitation line A is a clear region where the windshield does not fog.

Therefore, when the quantity of retained water is in the evaporator 18, as described above, by keeping the evaporator air temperature Te at a temperature lower than the windshield temperature Tws, the evaporator air temperature Te is always positioned in the clear region below the fogging limit line A. Accordingly, the fogging of the windshield can be surely prevented.

In this respect, even if the hot gas heating mode is performed in the region where the windshield temperature Tws is lower than −8° C., the quantity of condensed water evaporated in the evaporator 18 decreases, so that the fogging limit line A is bent to the high temperature side with respect to the evaporator air temperature Te to reduce the fogging region.

Figure 4B:
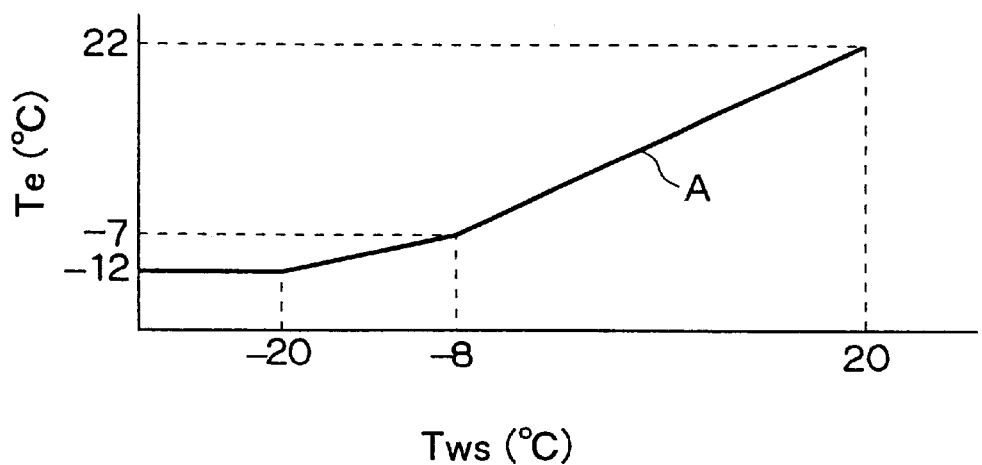
FIG. 4B is a control characteristic diagram of an evaporator air temperature (Te) in the hot gas heating mode.

FIG. 4B shows the relationship between the evaporator air temperature Te and the windshield temperature Tws when the windshield starts to fog. The line A is the same as the fogging limit line A in FIG. 4A. If the evaporator air temperature Te is controlled in such a way as to be lower than the windshield temperature of the line A with respect to a change in the windshield temperature Tws, the fogging of the windshield can be prevented. Since the evaporator air temperature Te on the line A is slightly higher than the windshield temperature Tws, if the evaporator air temperature Te is controlled to be lower than the windshield temperature Tws, the fogging of the windshield can be prevented further surely.

As can be seen from FIGS. 4A, 4B, in the region where the windshield temperature Tws is lower than −8° C., the evaporator air temperature Te when the windshield starts to fog is changed to the higher temperature side with respect to the windshield temperature Tws. Accordingly, it is allowed to use a value corrected to the higher temperature side than the actual windshield temperature, as the windshield temperature Tws at the step S40 in FIG. 3.

Next, the step S30 in FIG. 3 is supplementally described. The electromagnetic clutch 11 does not remain to be simply turned on at the step S30. Actually, the electromagnetic clutch 11 is intermittently turned on and off to control the operation of compressor 10 such that the discharge pressure Pd (discharge capacity) of the compressor 10 detected by the pressure sensor 27d becomes smaller than a predetermined pressure (for example, 20 kg/cm²G).

That is, when the discharge pressure Pd of the compressor 10 is lower than the predetermined pressure, the electromagnetic clutch 11 is energized to drive the compressor 10. In contrast, when the discharge pressure Pd of the compressor 10 is higher than the predetermined pressure, the current passing through the electromagnetic clutch 11 is interrupted to stop the compressor 10. In this manner, by intermittently turning on and off the compressor 10, the upper limit of the discharge pressure Pd of the compressor 10 can be controlled to be within the predetermined range described above in the heating mode of the hot gas heater cycle H. This can prevent an abnormal increase in the discharge pressure Pd of the compressor 10 and thus improve the endurance life of the compressor 10.

In the first embodiment, the step S20 described above constitutes determination means for determining whether or not a quantity of retained water is in the evaporator 18, and the steps S40, S30, S50 constitute control means for controlling the air temperature blown from the evaporator 18 in the heating mode.

Next, the concept of calculating the quantity of retained water in the evaporator 18 will be described with reference to FIGS. 5A–5D. FIG. 5A shows the relationship between a change in the operation mode of a refrigerating cycle for the air conditioner and a change in the quantity of retained water in the evaporator 18 associated therewith. When the cooling mode is set during the operation of the vehicle engine, the condensed water is generated by the cooling and dehumidifying operation of the evaporator 18, so that the quantity of retained water in the evaporator 18 increases in proportion to the operation time of the cooling mode (operation time of the compressor).

Here, FIG. 5A shows a change in the quantity of retained water in the case where the maximum quantity (full quantity) of condensed retained water in the evaporator 18 is 250 cc. The evaporator 18 is a laminated evaporator that is generally used in the vehicle air conditioner and is constructed of a heat-exchanging structure that is a combination of flat tubes constructed of laminated plates and corrugated fins. The condensed water is attached to and held on the surface of the fins and the like.

Since the full quantity of retained water is 250 cc in the example shown in FIGS. 5A–5D, when the quantity of retained water calculated by the ECU 26 reaches the full quantity of retained water (250 cc), the ECU 26 does not further increase the quantity of retained water but keep the quantity of retained water at a constant value (e.g., full quantity).

The example (1) in FIG. 5A shows the quantity of condensed water in the cooling mode shown in FIG. 5B. This quantity of condensed water shown in FIG. 5B is a quantity per unit time (cc/min) and means a value obtained by substituting the quantity of condensed water discharged from the discharge port 22a of the air conditioning case 22 from the quantity of condensed water generated from the evaporator 18. In the example (1) shown in FIG. 5B, the temperature of the horizontal axis designates the temperature Tsuck of evaporator suction air and the percentage (%) designates the relative humidity H(R) of the evaporator suction air. Further, Me2 shows the blower level. As the temperature Tsuck of the evaporator suction air becomes higher, the absolute humidity of the evaporator suction air increases and the quantity of condensed water increases.

In the example (1) in FIG. 5B, the Me2 of the horizontal axis shows that the quantity of air of the air conditioning blower 23 is the second middle quantity of air (in this example, about 280 m³/h). In this respect, the quantity of air of the air conditioning blower 23 can be manually switched between four steps of a low quantity of air (Lo), a first middle quantity of air (Me1), a second middle quantity of air (Me2), and a large quantity of air (Hi). The second middle quantity of air (Me2) is the second largest quantity of air next to the large quantity of air (Hi).

An uncontrolled mode includes both of a case where the compressor 10 is stopped during the operation of the vehicle engine 12 and where neither the cooling mode nor the hot gas heating mode is set, and a case where the compressor 10 is stopped in accordance with the stop of the vehicle engine 12, as shown by the example (2). Therefore, the uncontrolled mode in the present invention means the state where the compressor 10 is in the stop state.

Here, the uncontrolled mode includes both of a case where the air conditioning blower 23 is operated and a case where the air conditioning blower 23 is stopped. When the vehicle engine 12 is operated, the air conditioning blower 23 is generally in the state of operation. Therefore, in the uncontrolled mode in FIG. 5A, when the air conditioning blower 23 is stopped, the vehicle engine 12 is in the state of stop.

In the uncontrolled mode, because the condensed water is discharged from the discharge port 22a of the air conditioning case 22, the quantity of retained water in the evaporator 18 is decreased by the quantity of water discharged from the discharge port 22*a*. FIG. 5C shows the example (2). As shown in FIG. 5C, when the air conditioning blower 23 is stopped in the uncontrolled mode, the quantity of retained water in the evaporator 18 is decreased with a pass of time in the uncontrolled mode due to the quantity of water discharged from the discharge port 22*a*.

According to the inventor's experiment and study, in the uncontrolled mode, when the air conditioning blower 23 is stopped, a state where the quantity of water discharged from the discharge port 22*a* is large is kept for a predetermined time (specifically, one hour) after the stop of the compressor 10, and therefore the quantity of retained water in the evaporator 18 rapidly decreases for the predetermined time. Thereafter, the quantity of discharged water is decreased to a minimum quantity so that the quantity of retained water is decreased by a small quantity. Moreover, if the air blowing mode for operating the air conditioning blower 23 is set in the uncontrolled mode, the condensed water is pushed out from the evaporator 18 by the air flowing pressure to increase the quantity of discharged water again. Thus, as can be seen from the latter half portion in the uncontrolled mode in FIG. 5A, the quantity of retained water in the evaporator 18 decreases again by the operation of the blower 23.

Next, when the hot gas heating mode is set as shown by the example (3) in FIG. 5A, the condensed water is evaporated in the evaporator 18 by the radiation of the evaporator, so that the quantity of retained water in the evaporator 18 is decreased by the quantity of evaporated water. Here, even in the hot gas heating mode, since the condensed water is discharged from the discharge port 22*a* of the air conditioning case 22, the quantity of evaporated water shown in FIG. 5D (example (3)) includes the quantity of water discharged from the discharge port 22*a*. As shown in FIG. 5D, the quantity of water evaporated in the hot gas heating mode increases as the evaporator air temperature Te becomes higher.

From the study using FIGS. 5A–5D, the quantity of retained water in the evaporator can be fundamentally expressed by the following mathematical equation 1.

Quantity of retained water in the evaporator [$W(R)$]=quantity of condensed water [$W(C)$]–quantity of evaporated water [$W(E)$]–quantity of discharged water in the uncontrolled mode [$W(D)$]

[Mathematical Equation 1]

That is, [$W(R)$]=[$W(C)$]–[$W(E)$]–[$W(D)$] where the quantity of water discharged in the uncontrolled mode includes both of the quantity of water discharged when the air conditioning blower 23 is operated and the quantity of water discharged when the air conditioning blower 23 is stopped, as described above.

Next, a method for specifically calculating the quantity of retained water in the evaporator 18 will be described with reference to FIG. 6. The control routine in FIG. 6 starts with the start-up of the vehicle engine 12 (turning on an ignition switch). The control unit always calculates the quantity of retained water in the evaporator during the operation of the vehicle engine 12 and for a predetermined time (for example, one hour) after the stop of the vehicle engine 12, and updates the calculated value of the quantity of retained water in the evaporator at predetermined time intervals (for example, every one minute).

Figure 6:
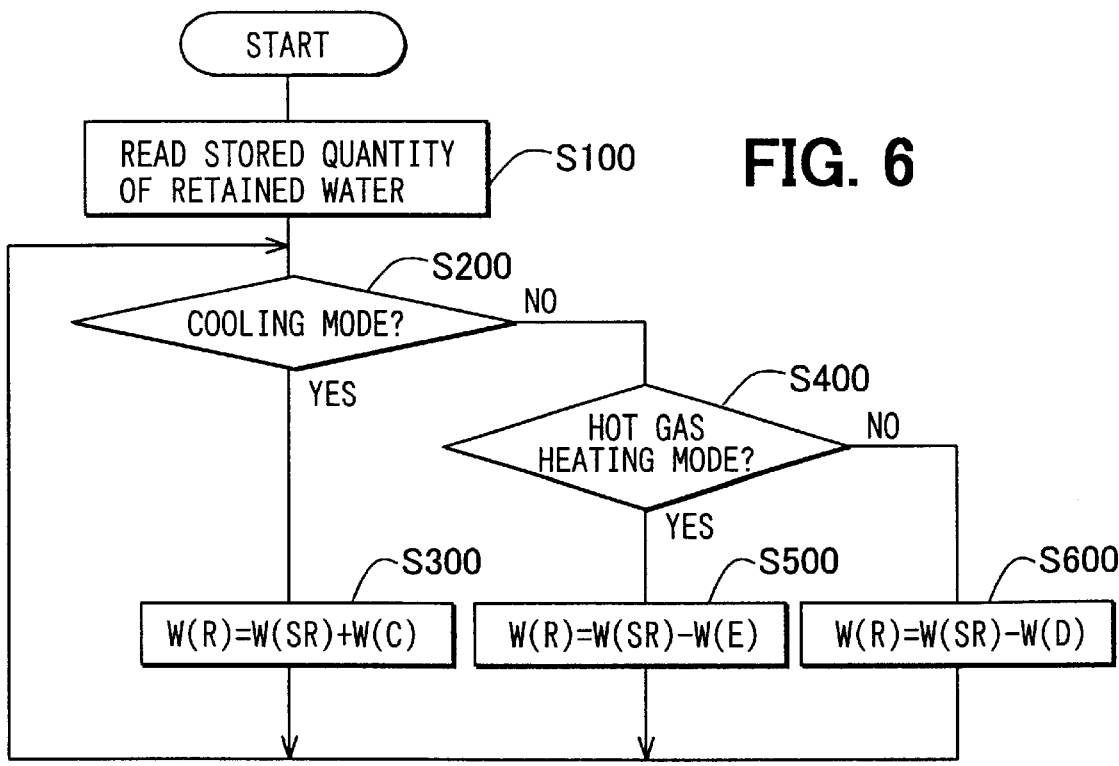
FIG. 6 is a flow diagram showing a method for calculating the quantity of retained water in the evaporator in accordance with the first embodiment.

In FIG. 6, first, the stored quantity of retained water is read at step S100. This stored quantity of retained water is the quantity of retained water in the evaporator that is calculated at a point where a predetermined time elapses after the previous stop of engine 12 and is stored by the storage means of the ECU 26. This storage means can store and hold the information of the quantity of retained water even after electric power supply to the ECU 26 is stopped.

At the next step S200, it is determined whether or not the cooling mode is set. Specifically, whether or not the cooling mode is set can be determined from whether or not the air conditioning switch 29*a* is turned on. When the cooling mode is set, the control routine advances to step S300 where the quantity of retained water in the cooling mode is calculated by the following equation:

$W(R)=W(SR)+W(C)$ wherein $W(R)$ is the quantity of retained water, $W(SR)$ is the stored quantity of retained water, and $W(C)$ is the quantity of condensed water.

Figure 7A:
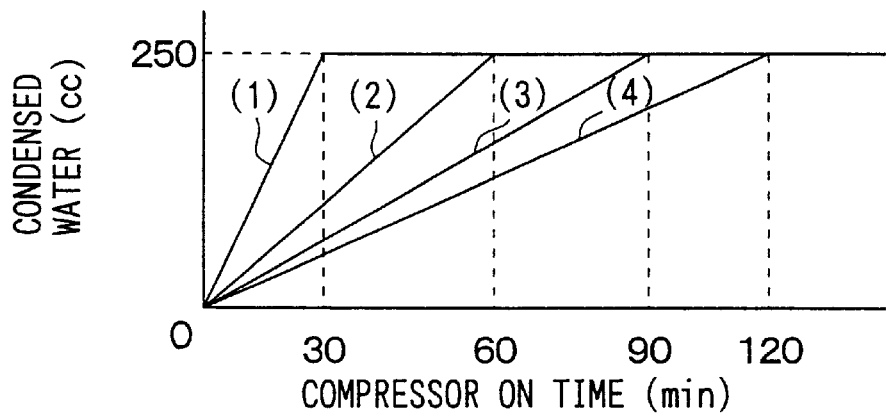
FIGS. 7A and 7B are characteristic diagrams for calculating the quantity of condensed water in a cooling mode in accordance with the first embodiment.

Specifically, the quantity of condensed water in the cooling mode is calculated based on the map in FIG. 7A. As the absolute humidity of the evaporator suction air becomes higher and the ON time of the compressor (electromagnetic clutch) in the cooling mode becomes larger, the quantity of condensed water becomes larger. Thus, the quantity of condensed water is calculated by information relating to the absolute humidity of the evaporator suction air and the ON time of the compressor. Examples (1)–(4) in FIG. 7A are selected by the information relating to the absolute humidity of the evaporator suction air. In FIG. 7A, the example (1) indicates the air suction condition in the case where the absolute humidity of the evaporator suction air is the highest, that is, in the case where the inside/outside air suction mode of the air conditioner is the outside air suction mode and where the outside air temperature is 20° C. or more or in the case where the inside/outside air suction mode of the air conditioner is the inside air suction mode. In general, the inside air is always higher in absolute humidity than the outside air. Therefore, in the inside air suction mode, irrespective of the magnitude of the temperature of the inside air temperature, assuming that the inside air suction mode corresponds to the case where the absolute humidity of the evaporator suction air is the highest, the characteristic of the example (1) is selected. In the case of the example (1), the quantity of condensed water per minute is 8.3 cc/min.

Next, the example (2) in FIG. 7A indicates the air suction condition in the case where the absolute humidity of the evaporator suction air is higher next to the example (1). That is, in the example (2), the inside/outside air suction mode of the air conditioner is the outside air suction mode and where the outside air temperature is lower than 20° C. and higher than or equal to 10° C. In the case of the example (2) in FIG. 7A, the quantity of condensed water per minute is 4.2 cc/min.

The example (3) of FIG. 7A indicates the air suction condition in the case where the absolute humidity of the evaporator suction air is higher next to the example (2). That is, in the example (3) of FIG. 7A, the inside/outside air suction mode of the air conditioner is the outside air suction mode and where the outside air temperature is lower than 10° C. and higher than 5° C. In the case of the example (3), the quantity of condensed water per minute is 2.8 cc/min. The example (4) of FIG. 7A indicates the air suction condition in the case where the absolute humidity of the evaporator suction air is the lowest. That is, in the example (4) of FIG. 7A, the inside/outside air suction mode of the air conditioner is the outside air suction mode and where the outside air temperature is lower than 5° C. In the example (4) of FIG. 7A, the quantity of condensed water per minute is 2.1 cc/min.

At step S300, the quantity of condensed water in the cooling mode is calculated based on the map in FIG. 7A and this quantity of condensed water is added to the stored quantity of retained water, so that the quantity of retained water in the cooling mode is calculated.

Here, the quantity of condensed water in the cooling mode is also related to the quantity of evaporator suction air and increases as the quantity of evaporator suction air increases. Thus, to increase the accuracy of the calculation of the quantity of condensed water, the quantity of condensed water calculated based on the map in FIG. 7A can be corrected to be increased as the quantity of evaporator suction air increases.

Figure 7B:
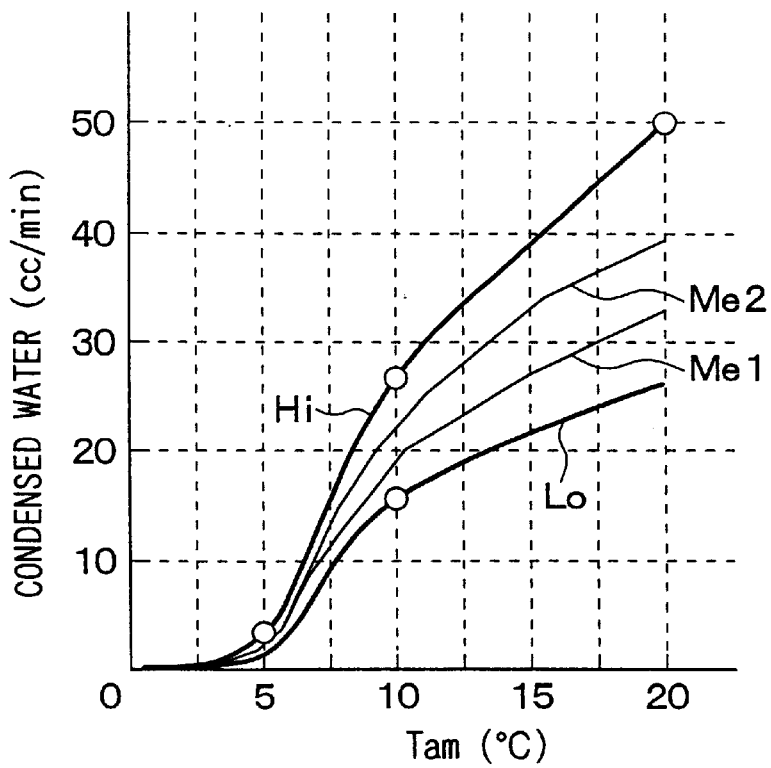

FIG. 7B shows a specific example for correcting the quantity of condensed water by the quantity of evaporator suction air. As the quantity of evaporator suction air increases and as the outside air temperature Tam increases, the quantity of condensed water per unit time increases.

That is, when the inside air/outside air suction mode of the air conditioner is the outside air suction mode, as shown in FIG. 7B, the quantity of condensed water per unit time is calculated based on the outside air temperature and the quantity of evaporator suction air, and is multiplied by the ON time of the compressor in the cooling mode, so that the quantity of condensed water in the cooling mode can be calculated.

Here, when the inside air/outside air suction mode of the air conditioner is the inside air suction mode, the outside air temperature on the horizontal axis in FIG. 7B can be replaced by the inside air temperature to calculate the quantity of condensed water per unit time. Accordingly, it is possible to calculate the quantity of condensed water with high accuracy in correspondence with the inside air suction mode or the outside air suction mode.

Moreover, in a manual air conditioner, an air mix door and a hot water flow adjusting valve which function as a temperature adjusting unit for adjusting the temperature of air blown into the passenger compartment, switching operation the quantity of air blown from the blower 23, switching operation of the inside air/outside air suction mode, and switching operation of the blowing mode are manually performed by the occupant. Accordingly, in the manual air conditioner, a signal indicating the inside air/outside air suction mode and the level of quantity of air can not be obtained. Therefore, in this case, a fixed value can be used as the quantity of condensed water per unit time. As to the fixed value, a value close to the maximum value shown in FIG. 7B, for example, 50 cc/min can be used because it acts on the safety side from the viewpoint of the control of preventing the fogging of the windshield.

On the other hand, if the determination result at step S200 is NO, the control routine advances to step S400 where it is determined whether or not the hot gas heating mode is set. Specifically, it is possible to determine whether or not the hot gas heating mode is set by whether or the hot gas switch 29b is turned on. When the hot gas heating mode is set, the control routine advances to step S500 where the quantity of retained water in the hot gas heating mode is calculated by the equation:

$$W(R)=W(SR)-W(E)$$

Here, W(R) is the quantity of retained water, W(SR) is the store quantity of retained water, and W(E) is the quantity of water evaporation.

Figure 8:
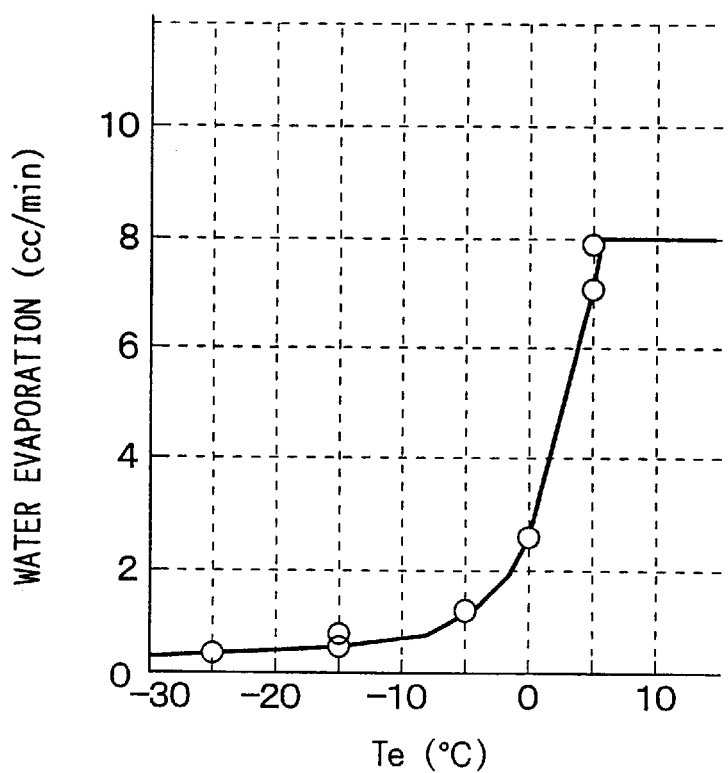
FIG. 8 is a characteristic diagram for calculating the quantity of water evaporation in the hot gas heating mode in accordance with the first embodiment.

Here, the quantity of water evaporation W(E) in the hot gas heating mode is specifically calculated based on the map in FIG. 8. As the evaporator air temperature Te becomes higher, the relative humidity in the vicinity of the evaporator tends to decrease and thus the quantity of evaporation of the condensed water increases. For this reason, the quantity of water evaporation per unit time (cc/min) increases in response to an increase in the evaporator air temperature Te. As shown in FIG. 8, the quantity of evaporation shows a quadratic property that rapidly increases in the range where the evaporator air temperature Te is −5° C. or more in the hot gas heating mode.

However, the hot gas heating mode is actually used, under conditions of low outside air temperature where the evaporator air temperature Te does not exceed 5° C. for preventing the fogging of the windshield, the property is made to keep the quantity of evaporation per unit time at the maximum value of 8 cc/min in the range where the evaporator air temperature Te is 5° C. or more.

Here, as the quantity of air blown by the air conditioning blower 23 (quantity of air passing through the evaporator) increases in the hot gas heating mode, the evaporator air temperature Te decreases in inverse proportion thereto. Thus, the characteristic in FIG. 8 is little affected by a change in the quantity of air blown by the air conditioning blower 23. Moreover, in the low temperature region where the evaporator air temperature Te is 0° C. or less, the phenomenon in which the condensed water in the frozen state is melted is also caused, so the quantity of evaporation in FIG. 8 includes the quantity of condensed water melted in this manner.

On the other hand, when the determination result at step S400 is NO, the mode is neither the cooling mode nor the hot gas heating mode, but is the uncontrolled mode where the compressor 10 is stopped. At this time, the control routine advances to step S600 where the quantity of retained water in the uncontrolled mode is calculated by the equation.

$$W(R)=W(SR)-W(D)$$

wherein, W(R) is the quantity of retained water in the evaporator, W(SR) is the stored quantity of retained water in the evaporator, and W(D) is quantity of discharged water.

Here, the quantity of discharged water in the uncontrolled mode is the quantity of condensed water to be discharged to the outside of the air conditioning case 22 from the discharge port 22a. Specifically, the quantity of discharge water in the uncontrolled mode is calculated based on the map in FIGS. 9A and 9B.

Figure 9A:
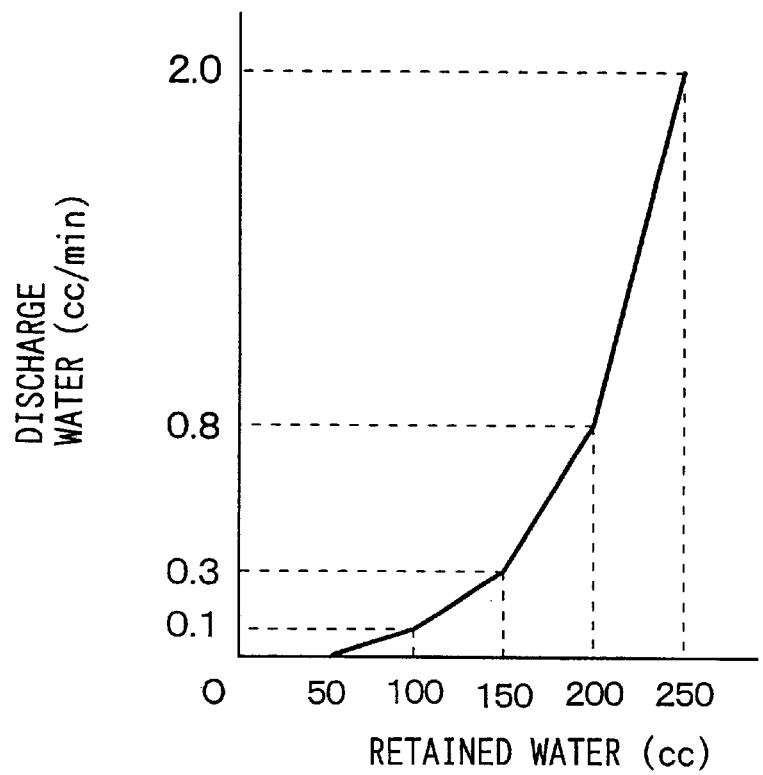
FIGS. 9A and 9B are characteristic diagrams for calculating the quantity of discharged water in an uncontrolled mode in accordance with the first embodiment.

FIG. 9A shows the quantity of condensed water per unit time discharged from the discharge port 22a (cc/min) when the air conditioning blower 23 is stopped in the uncontrolled mode. This quantity of condensed water discharged from the discharge port 22a when the blower 23 is stopped is closely related to the quantity of retained water currently in the evaporator in the uncontrolled mode. If the quantity of retained water in the evaporator increases more than about 150 cc, the quantity of discharged water per unit time rapidly increases. On the contrary, if the quantity of retained water in the evaporator decreases less than about 150 cc, the quantity of discharged water per unit time rapidly decreases. Further, if the quantity of retained water in the evaporator decreases to a level of 50 cc, the quantity of discharged water per unit time becomes nearly zero. As a result, even when the period of the uncontrolled mode becomes longer, about 50 cc of condensed water remains on the surfaces of the fins and the like of the evaporator 18 to be attached thereto.

Here, the case where the air conditioning blower 23 is stopped in the uncontrolled mode includes both of the case where the vehicle engine 12 is operated and the case where the vehicle engine 12 is stopped. When the vehicle engine 12 is stopped, to prevent a decrease in the charged capacity of a vehicle-mounted battery as much as possible, the operation of the ECU 26 after the stop of the vehicle engine 12 should be limited to as short as possible.

According to the above-mentioned characteristics in FIG. 5A, the quantity of discharged water decreases to a small quantity in a predetermined period of time (for example, one hour) after the start of the uncontrolled mode (after the stop of the blower). Thus, in the uncontrolled mode after the stop of the vehicle engine 12, the ECU 26 calculates the quantity of discharged water for the predetermined period of time (for example, one hour) after the stop of the engine, and the storage unit of the ECU 26 stores the quantity of retained water in the evaporator after the predetermined period of time after the stop of the engine. Counting time for the predetermined period after the stop of the engine 12 can be performed by the timer function of the ECU 26.

Figure 9B:
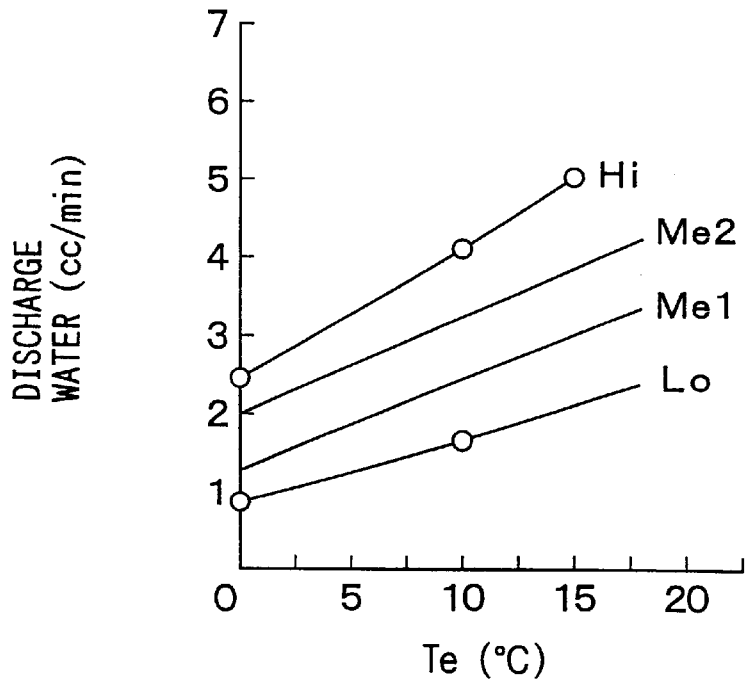

FIG. 9B shows the quantity of condensed water per unit time (cc/min) discharged from the discharge port 22a in the case where the air conditioning blower 23 is operated in the uncontrolled mode, that is, in the blowing mode. In this blowing mode, the condensed water attached to the surfaces of the fins and the like of the evaporator 18 is forcibly pushed out by the pressure of the blown air, so that the quantity of condensed water to be discharged increases extremely as compared with that when the blower 23 is stopped as shown in FIG. 9A.

As the quantity of blown air (pressure of the blown air) increases, as shown in FIG. 9B, the quantity of condensed water to be discharged in the blowing mode (during the operation of the blower) increases. Moreover, as the evaporator air temperature Te increases, the quantity of condensed water to be discharged in the blowing mode increases.

Here, there is the case where the mode is switched among the cooling mode, the hot gas heating mode, and the uncontrolled mode during the operation of the vehicle engine 12. In this case, at steps S300, S500, S600 in FIG. 6, the quantity of retained water calculated last in the former mode can be used as the stored quantity of retained water.

By the way, the windshield temperature Tws used for the determination at step S40 in FIG. 3 can be directly detected by a dedicated temperature sensor mounted on the inside surface of the windshield, but this method increases cost because of the additional temperature sensor. Thus, in the first embodiment, the windshield temperature Tws is calculated (estimated) by the use of the existing sensor signals of the air conditioner.

That is, the windshield temperature Tws is equal to the outside air temperature Tam in the initial state before the start-up of the air conditioner. Thereafter, when the warm air is blown into the passenger compartment by the operation of the heating mode, the windshield temperature Tws is increased by the warm air blown toward the windshield. As a result, assuming that an increase in the windshield temperature by the warm air is as ΔTws, the windshield temperature Tws can be calculated by the equation:

$$Tws = Tam + \Delta Tws$$

Figure 10:
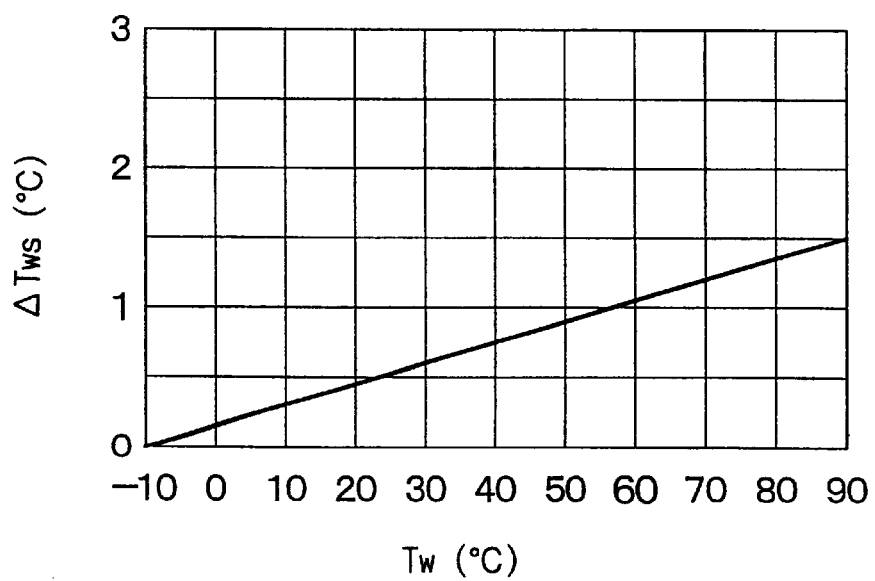
FIG. 10 is a characteristic diagram showing a relationship between an increase ($\Delta$Tws) in a windshield temperature (Tws) and an engine water temperature (Tw), in accordance with the first embodiment.

Here, since the warm air blown into the passenger compartment in the hot gas heating mode is heated by the hot water type heating heat exchanger 24 after it passes through the evaporator 18, the warm air temperature substantially depends on the hot water temperature. For this reason, the increase ΔTws in the windshield temperature by the warm air blow increases in proportion to an increase in engine cooling water temperature (hot water temperature circulating through the hot water type heating heat exchanger 24), as shown in FIG. 10. As a result, the increase ΔTws in the windshield temperature by the warm air can be calculated based on the engine cooling water temperature Tw (hot water temperature).

Since the increase ΔTws in the windshield temperature by the blown warm air is affected also by the quantity of warm air blown to the inner surface of the windshield in addition to the warm air temperature, in order to increase the accuracy of calculating the increase ΔTws in the windshield temperature, the effect of flow amount of the warm air is also considered. FIGS. 11A–11D are maps for calculating the increase ΔTws in the windshield temperature Tws in consideration of both the warm air temperature and the effect of the flow amount of warm air. The degree of effect of the quantity (flow amount) of warm air is determined by the air blowing level and the blowing mode of the air conditioner.

Here, in FIGS. 11A–11D, the air blowing level (blower level) means a level of voltage applied to the driving motor 23a of the air conditioning blower 23 and the number of revolution of the driving motor 23a. That is, the quantity of air blown by the air conditioning blower 23 can be adjusted by switching the blower level. In the first embodiment, when the quantity of air of the blower 23 is automatically controlled, the blower level (air blowing level) can be controlled in 32 steps by the control output of the ECU 26. The blower level of 6 corresponds to a small quantity of air (Lo) and is an air quantity level of about 150 m³/h.

Figure 11A:
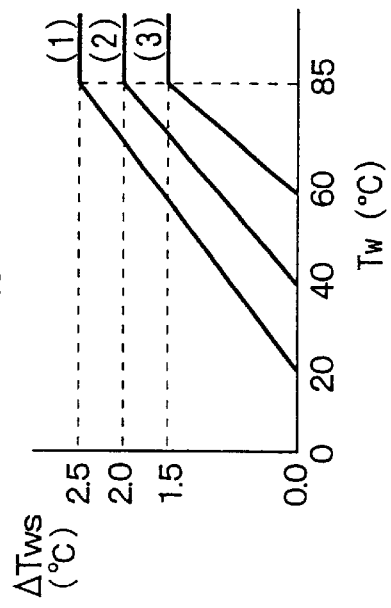
FIGS. 11A–11D are characteristic diagrams for calculating the increase ($\Delta$Tws) in the windshield temperature in accordance with the first embodiment.
Figure 11B:
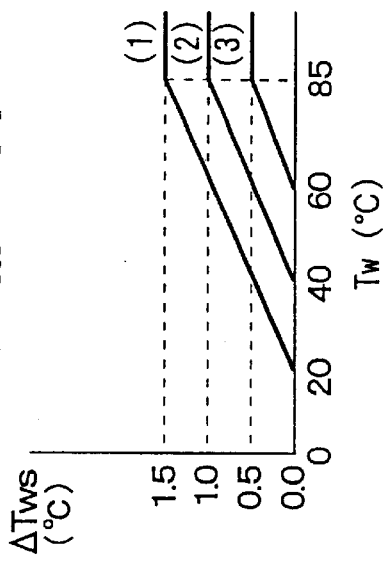

FIGS. 11A, 11B show the case where the blowing mode is the foot mode and the case where the blowing mode is the foot defroster mode. FIG. 11A shows the case where the forging blower level ≦6 (the case of the state of the small quantity of air (Lo)), and FIG. 11B shows the case where the forging blower level >6. Here, the foot defroster mode is the blowing mode in which, as compared with the foot mode, the quantity of air blown toward the foot area is decreased and the quantity of air blown toward the windshield is increased. Therefore, in the foot defroster mode, the quantity of air blown toward the foot area is nearly equal to the quantity of air blown toward the windshield.

Figure 11C:
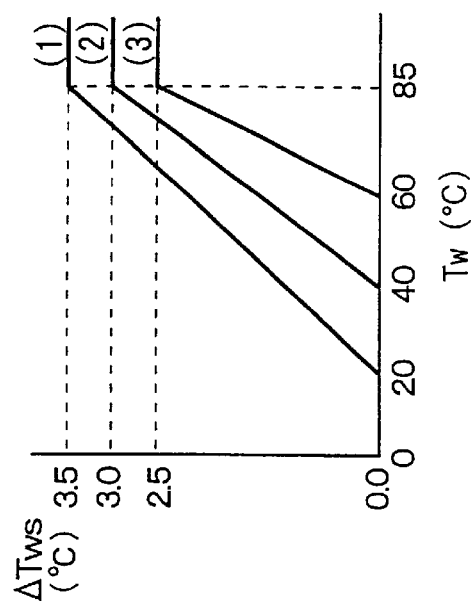
Figure 11D:
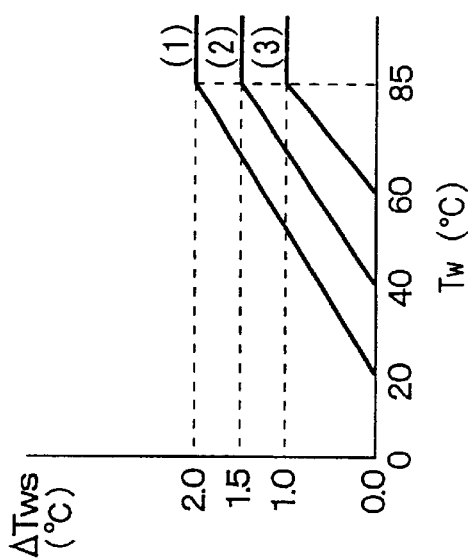

In contrast, FIGS. 11C, 11D show the case where the blowing mode is the defroster mode. FIG. 11C shows the case where the forging blower level ≦6 (the case of the small quantity of air (Lo)) and FIG. 11D shows the case where the forging blower level >6.

In addition, the hot gas heating mode includes not only a case where the hot gas heating mode is started just after the start-up of the vehicle engine 112 but also a case where the hot gas heating mode is started after the engine water temperature Tw increases to a certain temperature after a predetermined time elapses after the vehicle engine 112 is started. In the latter case, even if the engine water temperature Tw increases, the windshield temperature does not increase. Therefore, to improve accuracy, it is desirable that the increase ΔTws in the windshield temperature is calculated also in consideration of this condition. For this reason, in FIGS. 11A–11D, the increase ΔTws in the windshield temperature is calculated in three cases of: (1) a case where the hot gas heating mode is started under condition of the engine water temperature Tw≦20° C.; (2) a case where the hot gas heating mode is started under condition of 20 ° C.< the engine water temperature Tw≦40° C.; and (3) a case where the hot gas heating mode is started under condition of 40° C.< the engine water temperature Tw≦60° C.

With each map in FIGS. 11A–11D, it is possible to calculate the increase ΔTws in the windshield temperature with high accuracy in consideration of both of the temperature of warm air blown to the windshield and the effect of quantity of warm air blown toward the windshield. As a result, it is possible to calculate the windshield temperature Tws by the use of the existing sensors without requiring a temperature sensor only for detecting the windshield temperature.

Second Embodiment

In the first embodiment, the quantity of retained water in the evaporator is calculated based on the quantity of condensed water in the cooling mode, the quantity of water evaporation in the hot gas heating mode, and the quantity of discharged water in the uncontrolled mode. However, the uncontrolled mode where the compressor 10 is stopped, as described above, includes a case of setting the air blowing mode where only the air conditioning blower 23 is operated. If the outside air mode is selected in this air blowing mode, when the outside air passes through the outside air passage on the vehicle body side (the upstream side passage of the outside air introduction port 70 in FIG. 1), the outside air receives the heat from the vehicle engine 12 to increase its temperature. The increase in the outside air temperature caused by the reception of heat produces a phenomenon in which the water retained in the evaporator 18 evaporates.

Hence, in the second embodiment, the quantity of retained water in the evaporator is calculated by the following mathematical equation 2 in consideration of also the quantity of water evaporation in the air blowing mode described above.

Quantity of retained water in evaporator=quantity of condensed water in the cooling mode−quantity of water evaporation in the hot gas heating mode−quantity of discharged water in the uncontrolled mode−quantity of water evaporation in the air blowing mode  [Mathematical Equation 2]

Here, in the mathematical equation 2, the quantity of discharged water in the uncontrolled mode is the quantity of discharged water in the uncontrolled mode where the air conditioning blower 23 is also stopped, and the quantity of water evaporation in the air blowing mode is a value including the quantity of discharged water from the discharged port 22a.

A temperature increase caused by the reception of heat from the vehicle engine 12 can be calculated by the difference (Te−Tam) between the evaporator air temperature Te and the outside air temperature Tam. As the temperature difference (Te−Tam) increases, "the quantity of water evaporation in the air blowing mode" increases. Moreover, as the outside air temperature Tam becomes higher, the relative humidity of the outside air decreases and "the quantity of evaporation in the air blowing mode" increases. As a result, the quantity of evaporation in the air blowing mode can be calculated specifically based on the foregoing temperature difference (Te−Tam) and the outside air temperature Tam.

Figures 12A, 12B:
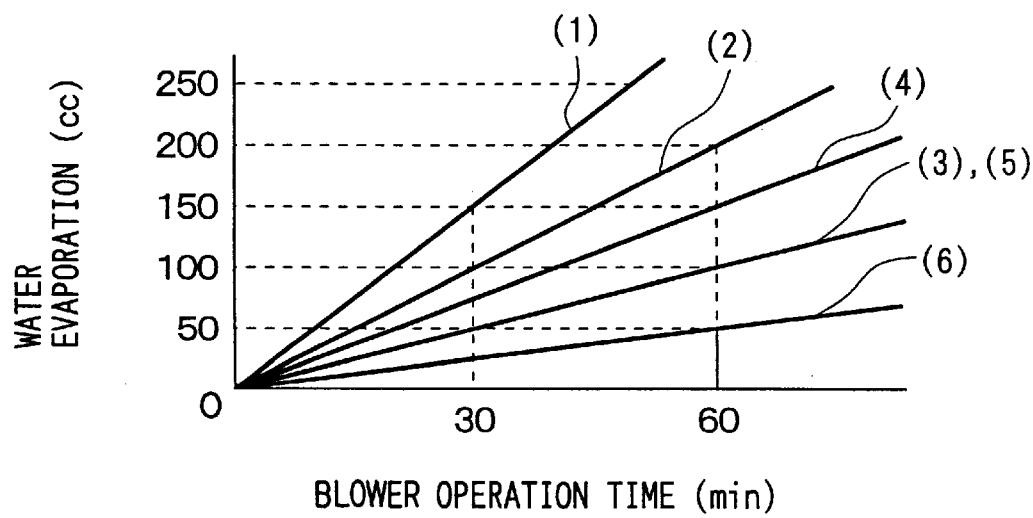
FIG. 12A is a table showing examples (1)–(6) for calculating the quantity of water evaporation W(E) in an air blowing mode in accordance with a second embodiment.
FIG. 12B is a characteristic graph showing a relationship between a blower operation time and the quantity of water evaporation W(E) in the air blowing mode in the examples (1)–(6) shown in FIG. 12A.

FIG. 12A shows examples of calculating the quantity of evaporation W(E) per unit time in the air blowing mode according to the concept described above. The quantity of water evaporation in the air blowing mode in the mathematical equation 2 includes the quantity of discharged water from the discharge port 22a. However, the quantity of water evaporation W(E) in FIGS. 12A and 12B is a value that does not include the quantity of water discharged from the discharge port 22a but includes only the pure quantity of evaporated water that is evaporated in the evaporator by the reception of heat from the outside air.

The example (1) in FIG. 12A shows a case where the above-mentioned temperature difference (Te−Tam) is large and also the outside air temperature Tam is high and where the quantity of water evaporation W(E)=5.00 cc/min.

Moreover, the example (6) in FIG. 12A shows a case where the above-mentioned temperature difference (Te−Tam) is small and the outside air temperature Tam is the lowest and where the quantity of water evaporation W(E)=0.83 cc/min. The quantity of water evaporation W(E) decreases from the example (1) to the example (3) gradually, and decreases from the example (4) to the example (6) gradually.

Here, the quantity of water evaporation W(E) in FIG. 12A is calculated in the case where only the blower 23 is operated (ON) when the inside air/outside air suction mode of the air conditioner is the outside air suction mode. On the other hand, under conditions other than the example (1) to the example (6), that is, when the inside air/outside air suction mode is the inside air suction mode, when the temperature difference (Te−Tam)<3° C., and when the outside air temperature Tam<0° C., in any case, the quantity of evaporation W(E)=0.

FIG. 12B shows the total quantity of water evaporation (cc) in the respective blower operation periods in the case where the quantity of water evaporation W(E) per unit time is in the examples (1) to (6) described above in FIG. 12A.

In the second embodiment, the other parts are similar to those of the above-described first embodiment, and detail description thereof is omitted.

Third Embodiment

In the first embodiment, the quantity of discharged water in the uncontrolled mode after the stop of the vehicle engine 12 (in the time period in which the blower is stopped) is calculated based on the map in FIG. 9A for a predetermined period of time after the stop of the engine, for example, for one hour by the timer unit of the ECU 26. However, in the third embodiment, counting time for the predetermined period of time after the stop of the engine can be performed by the use of existing sensor signals without using the timer unit.

Figure 13:
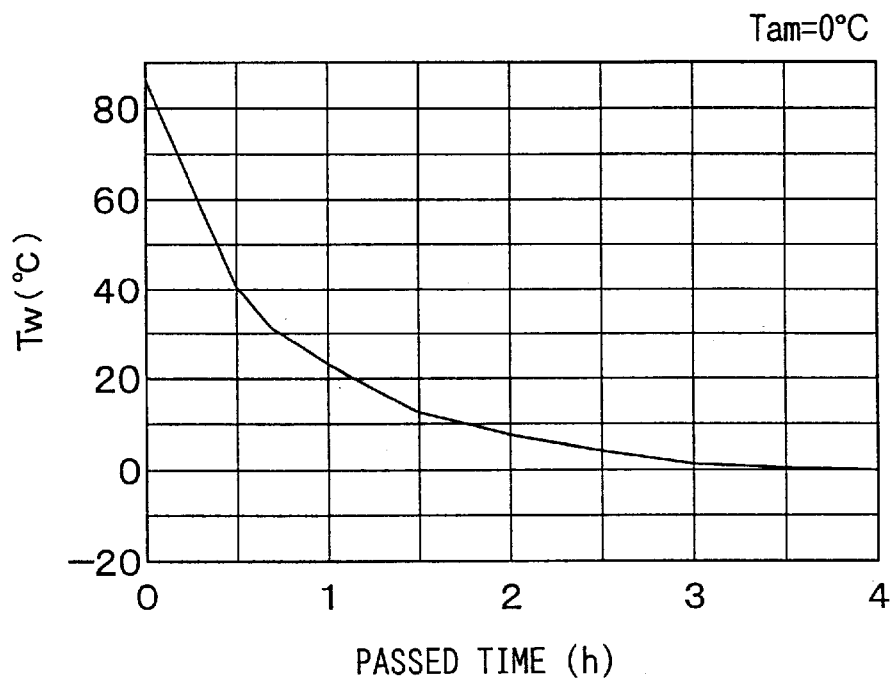
FIG. 13 is a characteristic graph showing a relationship between an engine water temperature (Tw) and a passed time after the stop of an engine, in accordance with a third embodiment.

That is, FIG. 13 shows a change in the engine water temperature Tw after the stop of the engine, and shows a change in the engine water temperature Tw in the case where the outside air temperature Tam=0° C. which is the minimum temperature in the state where the condensed water on the evaporator is discharged from the discharge port 22a of the case 22. Here, when the outside air temperature Tam becomes lower than 0° C., the condensed water in the evaporator is frozen, so that the water is not discharged from the discharge port 22a.

FIG. 13 shows the case where Tam=0° C. Therefore, the engine water temperature Tw is lowered toward 0° C. with a passed time after the stop of the engine. Thus, it is possible to calculate (estimate) the lapse of time h after the stop of the engine by the use of the decreasing characteristic of the water temperature Tw after the stop of engine.

Figure 14:
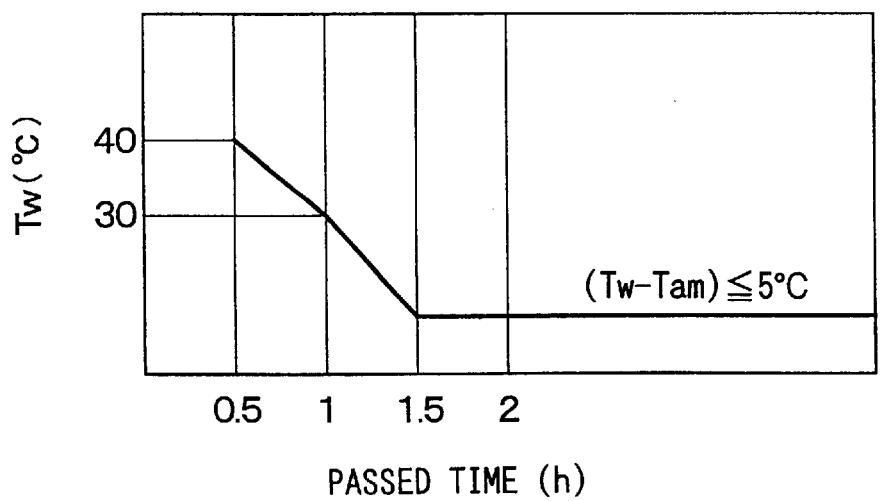
FIG. 14 is a characteristic graph for calculating the passed time after the stop of the engine based on an engine water temperature (Tw), in accordance with the third embodiment.

FIG. 14 shows its specific example. In FIG. 14, when the engine water temperature Tw is 80° C. or more before the stop of the engine and is lowered to 40° C. or less after the stop of the engine, it is estimated that thirty minutes elapse after the stop of the engine. Moreover, when the engine water temperature Tw is 80° C. or more before the stop of the engine and is lowered to 30° C. or less after the stop of the engine, it is estimated that one hour elapses after the stop of the engine.

Further, when the temperature difference (Tw−Tam) between the water temperature Tw and the outside air temperature Tam becomes 5° C. or less, it is estimated that one hour and half elapse after the stop of the engine, as shown in FIG. 14.

In this manner, the passed time (h) after the stop of the engine can be calculated (estimated) by determining the degree of decrease in the water temperature Tw after the stop of the engine and the temperature difference (Tw−Tam) between the water temperature Tw and the outside air temperature Tam. Thus, by using the passed time (h) after the stop of the engine, it is possible to calculate the quantity of discharged water for a predetermined period after the stop of the engine and to update the calculated value of the quantity of retained water in the evaporator. In this manner, it is possible to update the quantity of retained water in the evaporator for a predetermined time period after the stop of the engine by the use of simple means utilizing the existing sensor signals without using the timer unit.

Further, by updating the quantity of retained water in the evaporator after the stop of the engine and improving the accuracy of calculation of the quantity of retained water in the evaporator, it is possible to reduce the frequency of limiting the uppermost value of the evaporator air temperature Te (limiting the hot gas heating capacity) in the next hot gas heating mode and thus to effectively make use of the hot gas heating capacity to improve the heating performance in the passenger compartment.

Figure 15:
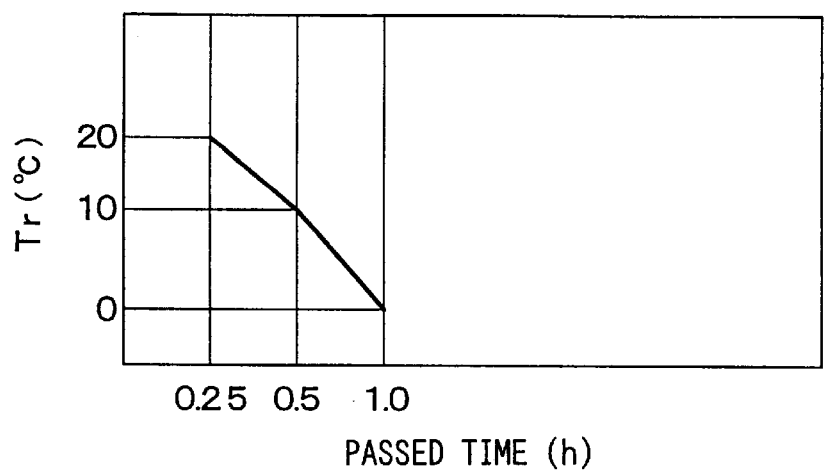
FIG. 15 is a characteristic graph for calculating the passed time after the stop of the engine based on an inside air temperature (Tr), in accordance with the third embodiment.

Here, it is possible to calculate (estimate) the lapse of time h after the stop of the engine by the use of the inside air temperature Tr in place of the engine water temperature Tw. FIG. 15 is a specific example in which the elapsed time (h) after the stop of the engine is calculated by the degree of decrease in the inside air temperature Tr after the stop of the engine in the case where Tam=0° C. For example, the elapsed time (h) after the stop of the engine is calculated as follows. When the inside air temperature Tr after the stop of the engine is 10° C., the elapsed time h=0.5 hour. Further, when the inside air temperature Tr after the stop of the engine is 0° C.→ the elapsed time (h)=1 hour.

Figure 16:
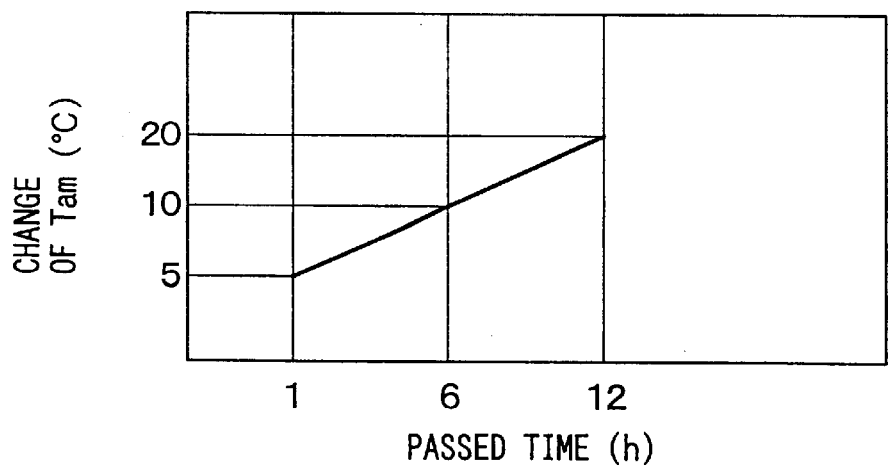
FIG. 16 is a characteristic graph for calculating the passed time after the stop of the engine based on a temperature change in an outside air temperature (Tam) before and after the stop of the engine in accordance with the third embodiment.

Further, the temperature difference (Tam1−Tam2) between the outside air temperature Tam1 when the vehicle engine 12 is stopped and the outside air temperature Tam2 when the vehicle engine 12 is started can be calculated in place of the engine water temperature Tw to calculate (estimate) the passed time h after the stop of the engine. FIG. 16 shows a specific example in which the elapsed time h after the stop of the engine is calculated by the temperature difference between the outside air temperature Tam when the vehicle engine 12 is stopped and the outside air temperature Tam when the vehicle engine 12 is started.

In the third embodiment, the other parts are similar to those of the above-described first embodiment, and detail description thereof is omitted.

Fourth Embodiment

In the first embodiment, the windshield temperature Tws is calculated by the equation Tws=Tam+ΔTws based on the outside air temperature Tam and the increase ΔTWS in the windshield temperature caused by the blown warm air. In the fourth embodiment, the calculation accuracy of the windshield temperature Tws is further improved.

Figure 17:
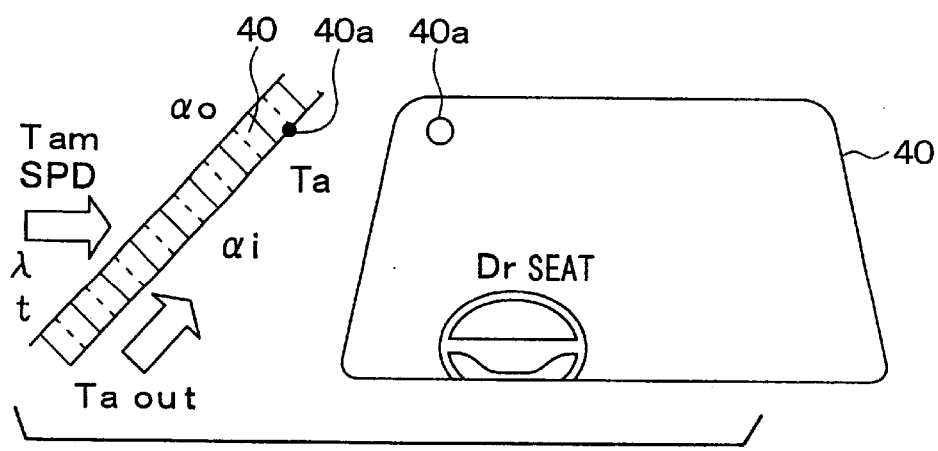
FIG. 17 is a schematic diagram for explaining a calculation of a windshield temperature (Tws) in accordance with a fourth embodiment.

FIG. 17 shows the concept of calculating (estimating) the windshield temperature Tws in accordance with the fourth embodiment. Since the vehicle windshield 40 is cooled by vehicle speed wind caused by vehicle running (wind caused by running dynamic pressure), in the fourth embodiment, the windshield temperature Tws is calculated in consideration of the cooling effect of the vehicle speed wind.

Specifically, the windshield temperature Tws is calculated by the following mathematical equation 3.

$$Tws=(\alpha i \times t/\lambda \times Ta+\alpha i/\alpha 0 \times Ta+Tam-\alpha i \times t/\lambda \times Tam)/(1+\alpha i/\alpha 0)$$

[Mathematical Equation 3]

wherein, $\alpha i$=heat transfer coefficient on the inside surface of the vehicle windshield 40 t=thickness of the vehicle windshield 40

$\lambda$=thermal conductivity of the vehicle windshield 40

Ta=warm air temperature at a windshield temperature estimation position 40a on the vehicle windshield 40 (see FIG. 17)

$\alpha 0$=heat transfer coefficient on the outside surface of the vehicle windshield 40

Tam=outside air temperature (1) Heat Transfer Coefficient $\alpha i$ on the Inside Surface of the Vehicle Windshield The heat transfer coefficient $\alpha i$ on the inside surface of the vehicle windshield is expressed by a function of (blowing mode, quantity of air of the blower). As the blowing mode changes in the manner of foot mode→foot defroster mode→defroster mode, and as the quantity of air of the blower increases, $\alpha i$ increases.

In other words, as the quantity of air from the blower increases, the quantity of air blown into the passenger compartment increases. Further, as the blowing mode changes in the manner of foot mode→foot defroster mode→defroster mode, the ratio of the quantity of defroster air blown to the inside surface of the vehicle windshield 40 to the quantity of air blown into the passenger compartment increases, so that $\alpha i$ increases.

(2) Heat Transfer Coefficient $\alpha 0$ on the Outside Surface of the Vehicle Windshield The heat transfer coefficient $\alpha 0$ on the outside surface of the vehicle windshield is expressed by a function of (vehicle speed SPD). As the vehicle speed SPD increases, $\alpha 0$ increases. In other words, as the vehicle speed SPD increase, cooling effect caused by the vehicle wind increases and the heat transfer coefficient $\alpha 0$ on the outside surface of the vehicle windshield increases.

(3) Warm Air Temperature Ta at the Windshield Temperature Estimation Position 40a This warm air temperature Ta can be calculated by the equation Ta=E (Tam−Taout)+Taout. In this equation, Taout designates the defroster blow air temperature from a defroster blowing port (not shown) connected to the defroster opening shown in FIG. 1 and can be calculated by the equation of Taout=Tam+K (Tw−Te). Here, Tw designates the engine water temperature, Te designates the evaporator air temperature, and K designates a correction factor. Moreover, in the calculation equation of Ta, E is a correction factor determined based on the blowing mode into the passenger compartment and the quantity of air of the blower.

Figure 18A:
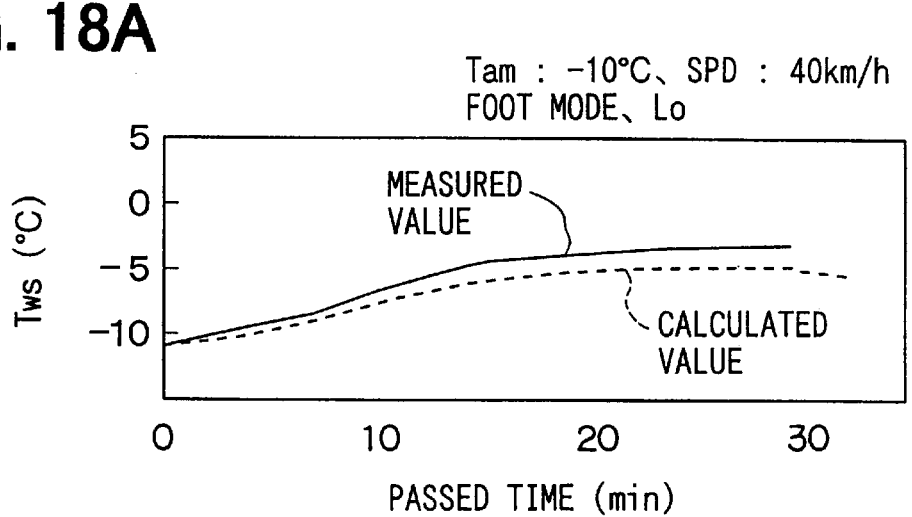
FIGS. 18A–18C are graphs each showing a calculated value and a measured value of the windshield temperature (Tws) in accordance with the fourth embodiment.
Figure 18B:
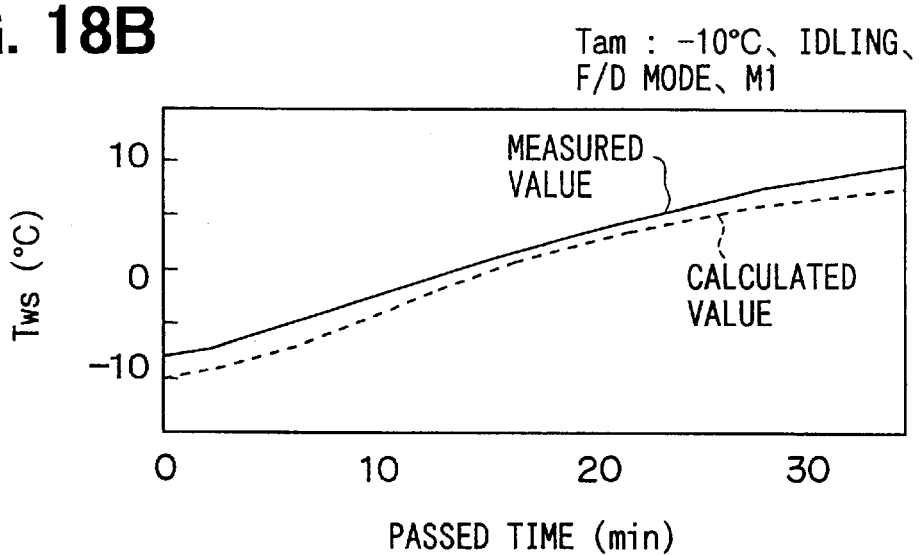
Figure 18C:
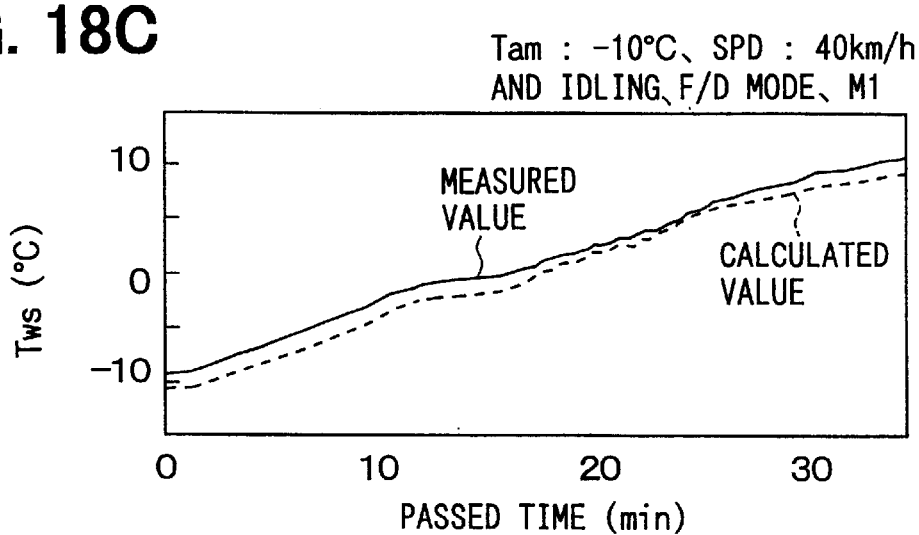

Each FIGS. 18A, 18B, 18C shows the calculated (estimated) value of the windshield temperature Tws and the measured value of the windshield temperature Tws in the fourth embodiment. The axis of abscissa designates a passed time after the start-up of the hot gas heating mode. FIG. 18A shows the measured value and the calculated value of the windshield temperature Tws when the vehicle runs at 40 km/h, FIG. 18B shows the measured value and the calculated value of the windshield temperature Tws when the vehicle is in the idling, FIG. 18C shows the measured value and the calculated value of the windshield temperature Tws when the vehicle runs at 40 km/h and is in idling repeatedly in a predetermined pattern. Further, the outside air temperature Tam, the blowing mode, and the blower level are indicated above the respective graphs.

In any condition of FIGS. 18A to 18C, the calculated values of the windshield temperature Tws in the fourth embodiment are slightly smaller than the measured values by an extremely small value of about 2° C. or less. In this manner, it is found that the calculated values of the windshield temperature Tws are slightly smaller than the measured values by an extremely small value of about 2° C. or less and that the accuracy of the calculated values of the windshield temperature Tws can be improved. Moreover, the calculated values of the windshield temperature Tws are slightly smaller than the measured values. Accordingly, the driving safety can be improved by effectively preventing the fogging of the windshield.

In the fourth embodiment, the other parts are similar to those of the above-described first embodiment, and detail description thereof is omitted.

Fifth Embodiment

In the first embodiment, as shown in FIG. 4, the evaporator air temperature Te is calculated based on only the windshield temperature Tws. Further, at step S20 in FIG. 3, it is determined whether or not the evaporator 18 has the quantity of retained water. In addition, when the control for preventing the fogging of the windshield is performed at steps S40, S30, S50, the compressor 10 is turned on and off so that the evaporator air temperature Te is lower than the windshield temperature Tws.

Here, in the case of the worst conditions where the condensed water in the evaporator 18 evaporates to make a relative humidity of 100%, it is necessary to control the operation of the compressor so that the evaporator air temperature Te is lower than the windshield temperature Tws. However, in reality, the air blown by the blower 23 is forcibly supplied to the evaporator 18, so that the relative humidity of the air passing through the evaporator does not increase to 100%. Further, as the quantity of air blown by the blower increases, the relative humidity of the air passing through the evaporator decreases.

Further, when the blowing mode is the foot mode, the quantity of air blown to the inside surface of the vehicle windshield is smaller than that in the defroster mode. Therefore, in the foot mode, the ratio of moisture blown to the inside surface of the vehicle windshield to moisture evaporated in the evaporator 18 is lower than that in the defroster mode. In this manner, in the foot mode, even if the condensed water evaporates, the absolute humidity near the inside surface of the vehicle windshield is lower than that in the defroster mode.

Figure 19:
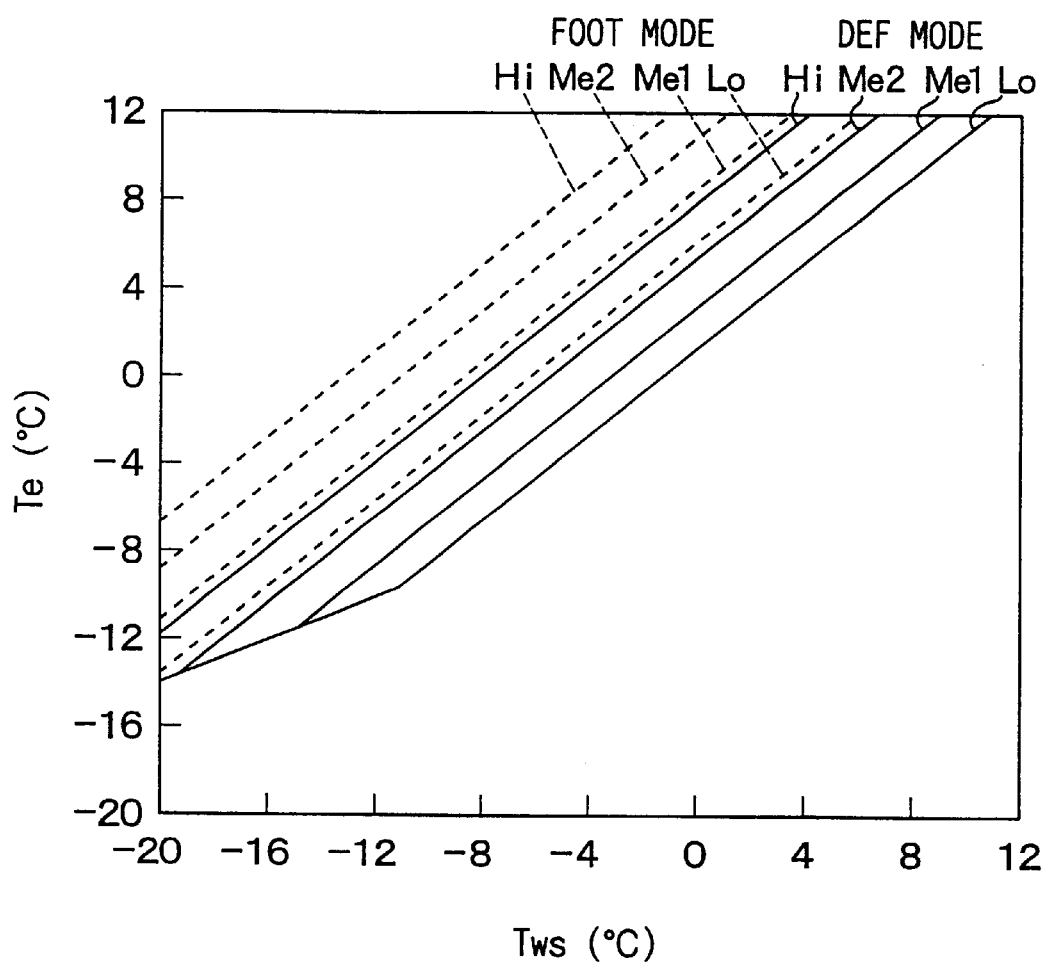
FIG. 19 is a characteristic diagram showing an evaporator air temperature control in accordance with a fifth embodiment.

Thus, in the fifth embodiment, in consideration of the above point, as shown in FIG. 19, the evaporator air temperature Te is corrected to a higher temperature with respect to the windshield temperature Tws in response to an increase in the quantity of air of the blower. Moreover, in the case where blowing mode is the foot mode, the evaporator air temperature Te is corrected to a higher temperature side than in the defroster mode. That is, as the quantity of air blown by the blower increases and as the quantity of air blown to the inside surface of the vehicle windshield decreases, a target evaporator air temperature to the windshield temperature Tws is corrected to a higher temperature.

In this manner, the evaporator air temperature Te is corrected to a higher temperature in accordance with the quantity of air from the blower and the blowing mode, so that the limitation of the hot gas heating capacity can be loosened when the quantity of retained water is in the evaporator 18, and heating capacity can be effectively improved.

Here, in the above description, the blowing mode is switched between the foot mode and the defroster mode in the hot gas heating mode. However, in the case where the blowing mode is switched among the foot mode, the foot defroster mode and the defroster mode, the quantity of air blown to the inside surface of the vehicle windshield decreases in the order of the defroster mode→the foot defroster mode→the foot mode. Accordingly, in this case, the target evaporator air temperature can be corrected to a higher temperature in this order of switching the blowing mode (the defroster mode→the foot defroster mode→the foot mode).

In the fifth embodiment, the other parts are similar to those of the above-described first embodiment, and detail description thereof is omitted.

Sixth Embodiment

If the group of sensors used for the control of preventing the fogging of the vehicle windshield causes a failure in the hot gas heating mode, the control for preventing the fogging of the vehicle windshield can not be appropriately performed. As a result, the fogging of the vehicle windshield may be caused.

Therefore, in the sixth embodiment, if the group of sensors used for the control of preventing the fogging of the vehicle windshield causes a failure, the ECU 26 determines the failure of the group of sensors and forcibly stops the operation of the hot gas heating mode. This can prevent the fogging of the vehicle windshield caused by the failure of the group of sensors.

The group of sensors used for the control of preventing the fogging of the vehicle windshield are, to be more specific, the evaporator air temperature sensor 27c for detecting the evaporator air temperature Te and sensors used for calculating the windshield temperature Tws. Further, specifically, the latter sensors are the outside air temperature sensor 27d, the engine water temperature sensor 27a, and the vehicle speed sensor (not shown). Here, as to a blowing mode signal, a signal of the quantity of air of the blower and the like, the control signals corresponding to them of the ECU 26 itself can be used just as they are, so sensor signals from the outside are not required.

In the sixth embodiment, the other parts are similar to those of the above-described first embodiment, and detail description thereof is omitted.

Other Embodiments

Here, in the above embodiments, the air conditioning operation panel 28 is provided with the dedicated hot gas switch 29b manually operated by the occupant and the hot gas heating mode is set by turning on the hot gas switch 29b. However, when the ECU 26 determines the maximum heating state and the like, the hot gas heating mode can be automatically started without providing the dedicated manually operated switch.

Moreover, in the manually operated air conditioner, the air conditioning operation panel 28 is provided with a dial-shaped or lever-shaped temperature adjusting operation member for manually operating temperature adjusting units such as an air mix door for adjusting the ratio of the quantity of warm air to the quantity of cool air and a hot water valve for adjusting a hot water flow rate in the heater core. Therefore, when this temperature adjusting operation member is operated to the maximum heating position, the hot gas switch 29b can be turned on in operative cooperation with the operation of the temperature adjusting operation member. This can eliminate the operation member dedicated for the hot gas switch 29b.

Such changes and modifications are to be understood as being within the scope of the present invention as defined by the appended claims

What is claimed is:

1. An air conditioner for a vehicle, comprising:
an air conditioning case defining an air passage through which air flows into a passenger compartment of the vehicle;
a refrigerant cycle system including a compressor for compressing refrigerant, an exterior heat exchanger disposed outside the air conditioning case, a pressure reducing device for decompressing refrigerant, an interior heat exchanger disposed inside the air conditioning case and a hot gas bypass passage through which refrigerant discharged from the compressor is directly introduced into the interior heat exchanger while bypassing the exterior heat exchanger, the refrigerant cycle system being constructed to switch a cooling refrigerant cycle where refrigerant discharged from the compressor is returned to the compressor through the exterior heat exchanger, the pressure reducing device and the interior heat exchanger, and a hot gas heater cycle where the refrigerant discharged from the compressor is directly introduced to the interior heat exchanger through the hot gas bypass passage; and
a control unit for controlling operation of the refrigerant cycle system to set a cooling mode for cooling air in the interior heat exchanger by using the cooling refrigerant cycle, and a heating mode for heating air in the interior heat exchanger by using the hot gas heater cycle, wherein:
the control unit includes
determining means for determining whether a quantity of retained water is in the interior heat exchanger, and
control means for controlling temperature of air blown out of the interior heat exchanger to a range lower than a dew point even when air blown out of the air conditioning case is cooled by a vehicle windshield when the determining means determines that the quantity of retained water is in the interior heat exchanger in the heating mode.

2. The air conditioner according to claim 1, wherein the control means controls the temperature of air blown out of the interior heat exchanger to be lower than temperature of the vehicle windshield when the determining means determines that the quantity of retained water is in the interior heat exchanger.

3. The air conditioner according to claim 1, wherein the control unit corrects a target temperature of air blown out of the interior heat exchanger with respect to temperature of the vehicle windshield, based on a blowing mode of air blown out of the air conditioning case and a quantity of air blown into the air conditioning case.

4. The air conditioner according to claim 1, wherein the control means controls the temperature of air blown out of the interior heat exchanger by controlling a discharge capacity of the compressor.

5. The air conditioner according to claim 1, wherein the control unit has calculation means for calculating the quantity of retained water based on at least a quantity of condensed water in the interior heat exchanger in the cooling mode, a quantity of evaporation of condensed water in the interior heat exchanger in the heating mode, and a quantity of condensed water discharged from a discharge port of the air conditioning case in an uncontrolled mode where the compressor is in a stop state.

6. The air conditioner according to claim 5, wherein the quantity of condensed water is calculated based on information relating to an absolute humidity of suction air of the interior heat exchanger and an operation time of the compressor.

7. The air conditioner according to claim 5, wherein the quantity of condensed water is calculated based on the temperature of suction air of the interior heat exchanger, a quantity of air passing through the interior heat exchanger, and an operation time of the compressor.

8. The air conditioner according to claim 5, wherein the quantity of evaporation is calculated based on temperature of air blown out of the interior heat exchanger.

9. The air conditioner according to claim 5, further comprising
a blower for blowing air in the air conditioning case, wherein:
in the uncontrolled mode, the control unit sets a blowing mode where the blower blows air into the air conditioning case; and
the quantity of discharged water in the uncontrolled mode is calculated based on a quantity of discharged water when the blower is stopped and a quantity of discharged water in the air blowing mode.

10. The air conditioner according to claim 9, wherein the quantity of discharged water per unit time when the blower is stopped is calculated based on the quantity of retained water in the interior heat exchanger.

11. The air conditioner according to claim 9, wherein the quantity of discharged water per unit time in the air blowing mode is calculated based on information including at least the quantity of air passing through the interior heat exchanger.

12. The air conditioner according to claim 9, wherein:
the control unit calculates the quantity of evaporation of condensed water in the interior heat exchanger in the air blowing mode, and
the quantity of evaporation of condensed water in the air blowing mode is used as information for calculating the quantity of retained water.

13. The air conditioner according to claim 1, wherein the temperature of the vehicle windshield is calculated based on an outside air temperature and a temperature increase of the vehicle windshield due to air blown out of the air conditioning case.

14. The air conditioner according to claim 13, wherein the temperature increase is calculated based on information relating to the temperature of air blown out of the air conditioning case, and information relating to the quantity of air blown out toward the vehicle windshield among air blown out of the air conditioning case.

15. The air conditioner according to claim 14, further comprising
a hot-water type heat exchanger for heating air by using hot water from a vehicle engine as a heat source, the hot-water type heat exchanger being disposed at a downstream air side of the interior heat exchanger in the air conditioning case, wherein:
the compressor is driven by the vehicle engine; and
the information relating to the temperature of air blown out of the air conditioning case is temperature of the hot water.

16. The air conditioner according to claim 15, wherein the information relating to the quantity of air blown out toward the vehicle windshield is a blowing mode of air blown into the passenger compartment from the air conditioning case and the quantity of air blown into the air conditioning case.

17. The air conditioner according to claim 1, wherein the temperature of the vehicle windshield is calculated based on an outside air temperature, information relating to a temperature of air blown out toward the vehicle windshield from the air conditioning case, and information relating to a vehicle speed.

18. The air conditioner according to claim 17, further comprising
- a hot water type heat exchanger, for heating air by using hot water from a vehicle engine as a heat source, disposed at a downstream air side of the interior heat exchanger in the air conditioning case, wherein:
  the compressor is driven by the vehicle engine; and
  the information relating to the temperature of air blown out toward the vehicle windshield includes temperature of the hot water, a temperature of air blown out of the interior heat exchanger, a blowing mode of air blown into the passenger compartment from the air conditioning case, and a quantity of air blown into the air conditioning case.

19. The air conditioner according to claim 1, wherein the control unit stops the heating mode when it is determined in the heating mode that a group of sensors relating to a fogging prevention control of the vehicle windshield fails.

20. The air conditioner according to claim 1, wherein:

when an entire amount of water on the evaporator is large than a predetermined amount, the determining means determines that the quantity of retained water is in the interior heat exchanger in the heating mode.

* * * * *